(12) United States Patent
Yang et al.

(10) Patent No.: US 10,936,894 B2
(45) Date of Patent: Mar. 2, 2021

(54) SYSTEMS AND METHODS FOR PROCESSING IMAGE DATA BASED ON REGION-OF-INTEREST (ROI) OF A USER

(71) Applicant: SZ DJI TECHNOLOGY CO., LTD., Shenzhen (CN)

(72) Inventors: Xiaohu Yang, Shenzhen (CN); Ye Tao, Shenzhen (CN); Zhongqian You, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 213 days.

(21) Appl. No.: 16/160,127

(22) Filed: Oct. 15, 2018

(65) Prior Publication Data

US 2019/0050664 A1 Feb. 14, 2019

Related U.S. Application Data

(63) Continuation of application No. PCT/CN2016/080067, filed on Apr. 22, 2016.

(51) Int. Cl.
*G06K 9/00* (2006.01)
*G06K 9/32* (2006.01)
(Continued)

(52) U.S. Cl.
CPC ....... *G06K 9/3233* (2013.01); *G02B 27/0093* (2013.01); *G02B 27/0172* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 8,885,882 B1* | 11/2014 | Yin | G06K 9/00248 382/103 |
| 2002/0081033 A1* | 6/2002 | Stentiford | G06K 9/4671 382/218 |

(Continued)

FOREIGN PATENT DOCUMENTS

| | | |
|---|---|---|
| CN | 101405680 A | 4/2009 |
| CN | 101895741 A | 11/2010 |

(Continued)

OTHER PUBLICATIONS

The World Intellectual Property Organization (WIPO) International Search Report and Written Opinion for PCT/CN2016/080067 dated Jan. 12, 2017 9 pages.

*Primary Examiner* — Alex Kok S Liew
(74) *Attorney, Agent, or Firm* — Anova Law Group, PLLC

(57) ABSTRACT

A display device includes a display area configured to display one or more images of a virtual reality (VR) environment or an augmented reality (AR) environment, one or more sensors configured to obtain region-of-interest (ROI) data of a user in response to the user wearing the display device and looking at the one or more images of the VR environment or the AR environment displayed on the display area, and one or more processors. The one or more processors are individually or collectively configured to select one or more ROI zones from a plurality of zones based on the ROI data and effect display of the one or more ROI zones on the display area to the user. The plurality of zones are used to divide the one or more images of the VR environment or the AR environment on the display area.

19 Claims, 15 Drawing Sheets

(51) Int. Cl.
  *G06F 3/01*   (2006.01)
  *G02B 27/00*  (2006.01)
  *G02B 27/01*  (2006.01)
  *G06T 9/00*   (2006.01)
  *G06T 19/00*  (2011.01)

(52) U.S. Cl.
  CPC .............. *G06F 3/011* (2013.01); *G06F 3/012* (2013.01); *G06F 3/013* (2013.01); *G06K 9/00604* (2013.01); *G06T 9/00* (2013.01); *G06T 19/006* (2013.01); *G02B 2027/0187* (2013.01)

(56) References Cited

U.S. PATENT DOCUMENTS

| | | |
|---|---|---|
| 2010/0296583 A1 | 11/2010 | Li |
| 2014/0178033 A1 | 6/2014 | He |
| 2014/0247277 A1 | 9/2014 | Guenter et al. |
| 2016/0044298 A1* | 2/2016 | Holz .................... H04N 5/2253 348/47 |
| 2016/0109957 A1* | 4/2016 | Takashima .............. G06F 3/011 345/8 |

FOREIGN PATENT DOCUMENTS

| | | |
|---|---|---|
| CN | 204480228 U | 7/2015 |
| WO | 2015054562 A1 | 4/2015 |

\* cited by examiner

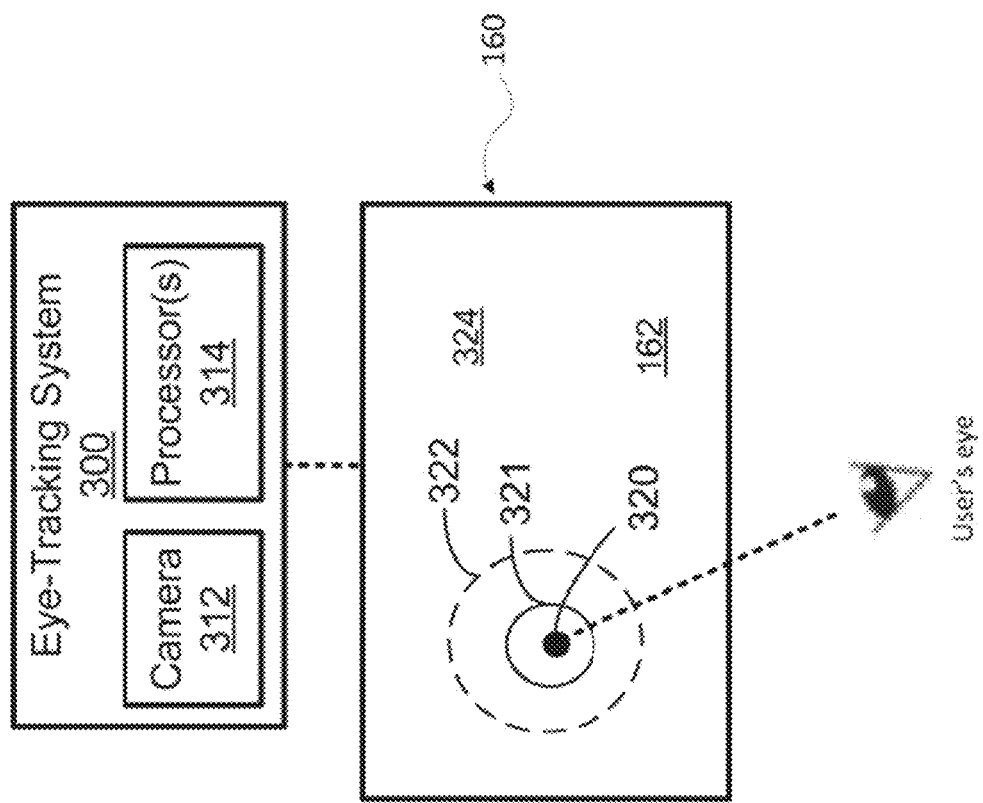
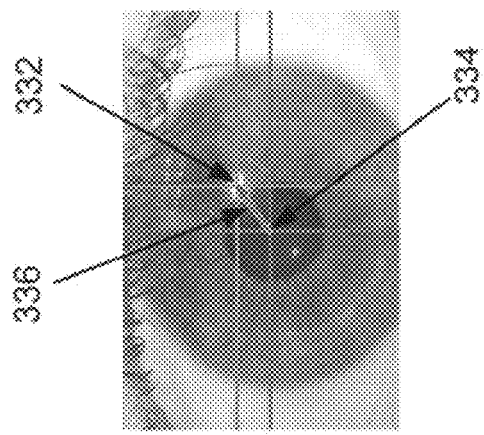
FIG. 3A

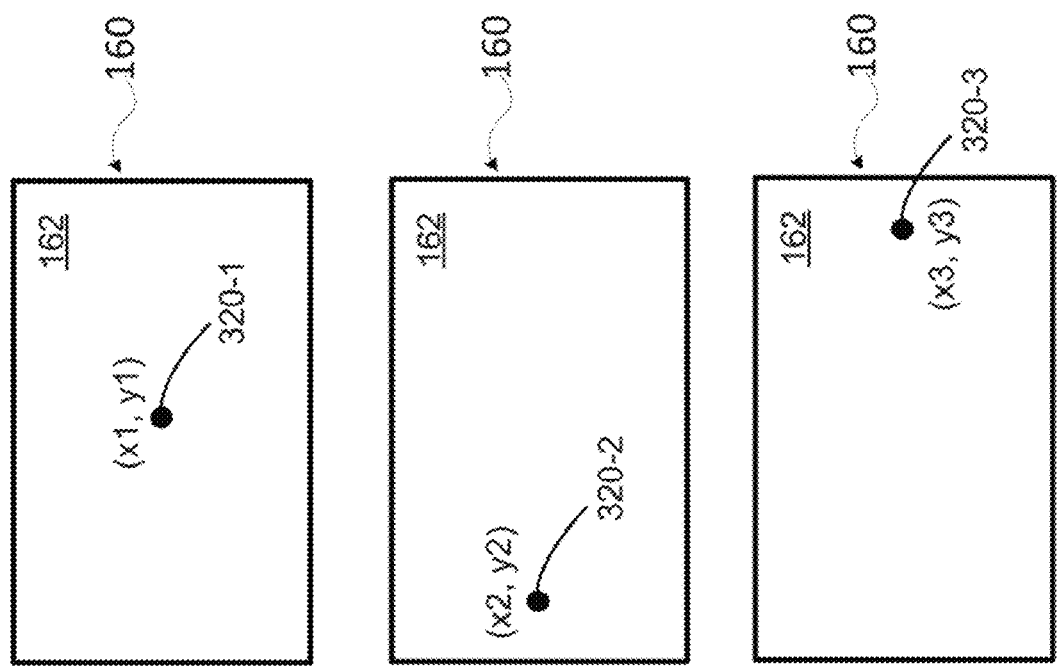
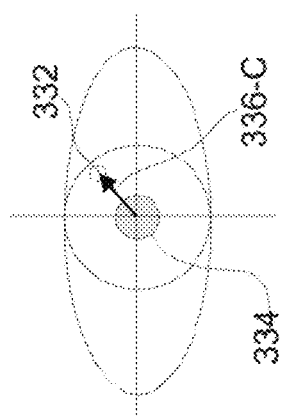
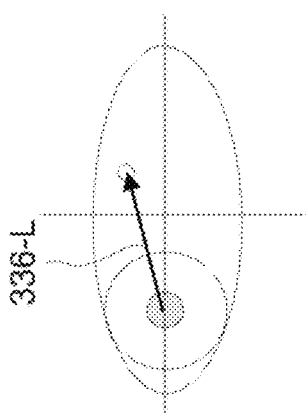
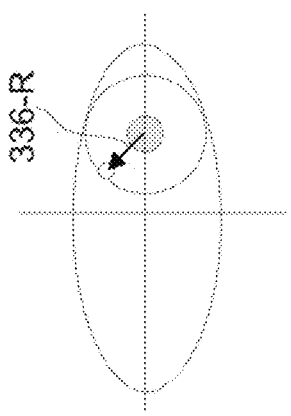
*FIG. 3B*

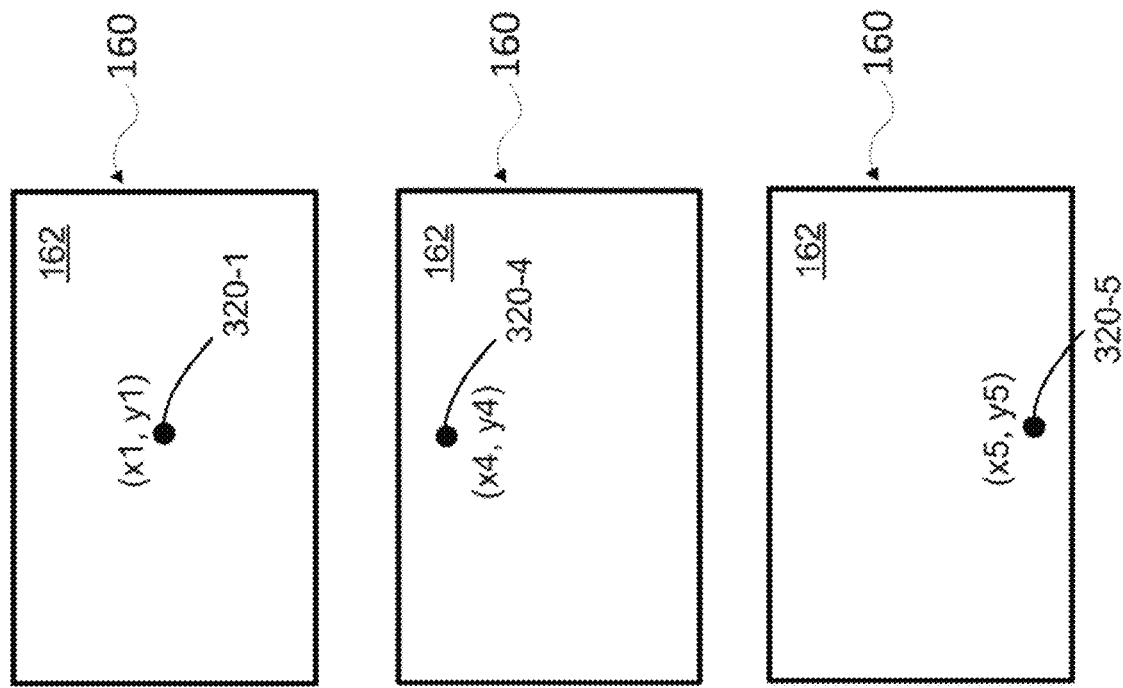
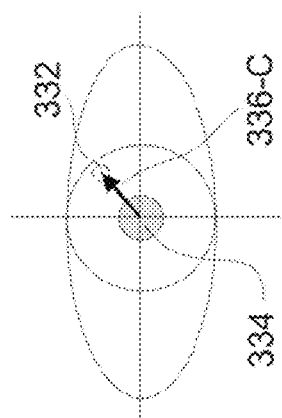 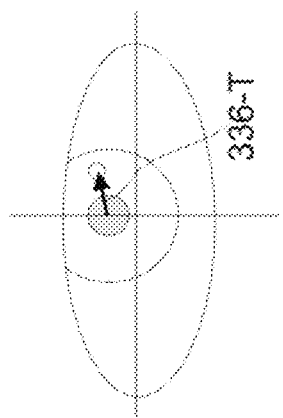 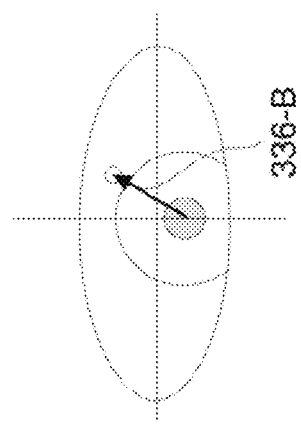
Part A — Eye looking at center of display area
Part B — Eye looking at top portion of display area
Part C — Eye looking at bottom portion of display area
FIG. 3C

SYSTEMS AND METHODS FOR PROCESSING IMAGE DATA BASED ON REGION-OF-INTEREST (ROI) OF A USER

CROSS-REFERENCE TO RELATED APPLICATION

This application is a continuation of International Application No. PCT/CN2016/080067, filed on Apr. 22, 2016, the entire contents of which are incorporated herein by reference.

BACKGROUND

In traditional aerial photography transmission systems, image coded data captured by an onboard camera is transmitted to a ground station in a wireless manner with limited bandwidth. Traditionally, all regions in a single image frame are coded using a unified strategy. For example, in a high-definition image transmission system where users may use big screen to view images, a region or target of interest may occupy a relatively small area. When there is limited transmission bandwidth, the unified coding strategy cannot provide the user with clear views in the region or target of interest. Additionally, the user can only passively view the images without being able to interact with the system. The user's region or target of interest cannot be dynamically tracked or provided.

SUMMARY

It is advantageous to have systems and methods for capturing and processing images based on dynamic region-of-interest (ROI) tracking as disclosed herein. Imaging devices may be supported on an aerial vehicle for capturing images. Image captured may include the capture of still images and/or videos. An image encoder may also be supported by the aerial vehicle for processing the captured images. The processed images may be displayed to a user at a control terminal. The control terminal may include a display device. The display device may be configured to display image data (e.g., the processed images). The display device may be configured to be worn by a user. For example, the display device may be a pair of glasses, goggles, or a head-mounted display. The display device may include any type of wearable computer or device incorporating either augmented reality (AR) or virtual reality (VR) technologies. AR and VR technologies involve computer-generated environments that provide new ways for consumers to experience content. In augmented reality (AR), a computer-generated environment is superimposed over real world images. In virtual reality (VR), the user is immersed in a computer-generated environment. The display device may be configured to display a plurality of images of a virtual reality (VR) environment or an augmented reality (AR) environment on a display area. The display area may be a screen, or provided on a screen. The display device may also comprise one or more sensors configured to obtain region-of-interest (ROI) data of a user when the user is wearing the display device and looking at the plurality of images of the VR environment or the AR environment displayed on the display area. The display device may further comprise one or more processors individually or collectively configured to (1) select one or more images that are indicative of the ROI data from among said plurality of images, and (2) effect display of the selected one or more images on the display area to the user.

A ROI tracking/determination system may be located at the control terminal (and/or display device) for dynamically tracking the ROI of the user. The ROI tracking/determination system may transmit collected ROI data to an image encoder, and the image encoder may compress image data corresponding to the ROI region of the user using a first compression rate and image data corresponding to a non-ROI region using a second compression rate greater than the first compression rate. The image data corresponding to the ROI region may also be processed to have enhanced image quality compared to the image data corresponding to the non-ROI region. Advantageously, the approaches described herein may reduce the file size and thus effectively save the transmission bandwidth, which may result in better viewing experience.

In one aspect of the disclosure, a display device for displaying image data is provided. The display device may be configured to be worn by a user. The display device may comprise: a display area configured to display one or more images of a virtual reality (VR) environment or an augmented reality (AR) environment; one or more sensors configured to obtain region-of-interest (ROI) data of the user when the user is wearing the display device and looking at the one or more images of the VR environment or the AR environment displayed on the display area; and one or more processors individually or collectively configured to (1) select, based on the ROI data, one or more ROI zones from a plurality of zones that are used to divide the one or more images on the display area, and (2) effect display of the one or more ROI zones on the display area to the user.

A method for displaying image data is provided in another aspect of the disclosure. The method may comprise: displaying one or more images of a virtual reality (VR) environment or an augmented reality (AR) environment on a display area of a display device; obtaining region-of-interest (ROI) data of a user when the user is wearing the display device and looking at the one or more images of the VR environment or the AR environment displayed on the display area; and (1) selecting, based on the ROI data, one or more ROI zones from a plurality of zones that are used to divide the display area, and (2) effecting display of the one or more ROI zones on the display area to the user.

In a further aspect of the disclosure, a non-transitory computer-readable medium storing instructions that, when executed, causes a computer to perform a method for displaying image data is provided. The method performed by the computer may comprise: displaying one or more images of a virtual reality (VR) environment or an augmented reality (AR) environment on a display area of a display device; obtaining region-of-interest (ROI) data of a user when the user is wearing the display device and looking at the one or more images of the VR environment or the AR environment displayed on the display area; and (1) selecting, based on the ROI data, one or more ROI zones from a plurality of zones that are used to divide the display area, and (2) effecting display of the one or more ROI zones on the display area to the user.

In some embodiments, the display device may comprise a pair of VR-enabled glasses or AR-enabled glasses. The display area may be a screen comprising a plurality of pixels. The display area may comprise a plurality of coordinates. The ROI data may be associated with one or more sets of coordinates selected from the plurality of coordinates.

In some embodiments, the one or more ROI zones may be selected from the plurality of zones when the ROI data indicates that a ROI of the user is within the one or more ROI zones. The ROI of the user may be associated with an eye gaze location of the user. The eye gaze location may be detected by the one or more sensors when the user is looking at the one or more images of the VR environment or the AR environment displayed on the display area.

In some embodiments, the one or more sensors may be included in an eye-tracking system configured to collect data related to movement of at least one eye of the user. The eye-tracking system may be configured to determine the eye gaze location of the user based on a relative position between a pupil of the user and a screen reflection corresponding to the display area reflected on a corresponding eye of the user. The eye-tracking system may be configured to (1) track a location of the screen reflection on at least one eye of the user and a location of a corresponding pupil of the user, and (2) extrapolate the eye gaze location within the display area using a predetermined relationship between the location of the screen reflection and the location of the pupil.

In some embodiments, the eye-tracking system may be configured to perform a calibration process of the user to determine the relationship between the location of the screen reflection and the location of the pupil. The eye-tracking system may be configured to track head movement of the user to determine position information of the screen reflection on the at least one eye of the user.

In some embodiments, the plurality of zones may be displayed overlaying the one or more images of the VR environment or the AR environment displayed on the display area. In some embodiments, a grid pattern comprising the plurality of zones may be displayed on the display area. The grid pattern may be displayed overlaying the one or more images of the VR environment or the AR environment displayed on the display area.

In some embodiments, at least two zones of the plurality of zones may be at least partially overlapped with each other. An individual zone of the plurality of zones may be at least partially overlapped with the rest of the zones of the plurality of zones.

In some embodiments, the one or more processors in the display device may be individually or collectively configured to (1) effect display of a first ROI zone on the display area when the ROI of the user is within the first ROI zone, and (2) effect display of a second ROI zone on the display area when the ROI of the user switches from the first ROI zone to the second ROI zone, wherein the second ROI zone is different from the first ROI zone. The first ROI zone and the second ROI zone may be located on different sections of the display area. The first ROI zone and the second ROI zone may have different sizes and/or shapes.

A first set of image data in the first ROI zone may be different from a second set of image data in the second ROI zone. In some embodiments, the first set of image data and the second set of image data may be provided within a same image of the VR environment or the AR environment on the display area. In other embodiments, the first set of image data and the second set of image data may be provided within different images of the VR environment or the AR environment on the display area. The first set of image data may be associated with a first image of the VR environment or the AR environment, and the second set of image data may be associated with a second image of the VR environment or the AR environment.

In some embodiments, effecting display of the one or more ROI zones on the display area may comprise changing a magnification and/or resolution of the one or more ROI zones. For example, image data from the one or more ROI zones may be displayed at a higher magnification and/or resolution compared to image data from one or more non-ROI zones. Image data from the one or more ROI zones may be converted to a first set of images, and image data from one or more non-ROI zones may be converted to a second set of images. The first set of images may be displayed to superimpose or overlay the second set of images on the display area.

In some embodiments, image data from the one or more ROI zones may be compressed at a first compression rate, and image data from the one or more non-ROI zones may be compressed at a second compression rate different from the first compression rate. For example, the first compression rate may be lower than the second compression rate, such that the first set of images in the one or more ROI zones is displayed at a higher quality than the second set of images in the one or more non-ROI zones. In some cases, the first set of images in the one or more ROI zones may be updated at a higher frequency than the second set of images in the one or more non-ROI zones on the display area.

In some embodiments, the first set of images in the one or more ROI zones may be configured to occupy a central region of the display area, and the second set of images in the one or more non-ROI zones may be configured to occupy a peripheral region of the display area.

In some embodiments, one or more images may be captured by an imaging sensor borne by a movable object. The movable object may be an aerial vehicle, a land vehicle, a vehicle traversing water body, a mobile phone, a tablet, a laptop, or a wearable device. The display device may be located remotely from the movable object.

The one or more captured images may be fused together with the plurality of zones to generate the one or more images of the VR environment or the AR environment displayed on the display area. The ROI data may be transmitted via one or more wired and/or wireless communication channels to the imaging sensor. One or more operating parameters of the imaging sensor may be adjusted based on the ROI data. The one or more operating parameters of the imaging sensor may comprise a depth of field, aperture size, shutter speed, zoom, focus area, frame rate, and/or position of the imaging sensor relative to the movable object. One or more operating parameters of the imaging sensor may be adjusted in order to effect display of the one or more ROI zones on the display area to the user.

In some embodiments, a graphical element may be overlay onto the one or more images of the VR environment or the AR environment displayed on the display area. The graphical element may be indicative of one or more motion characteristics of the movable object. The one or more motion characteristics of the movable object may comprise a position, speed, acceleration, and/or orientation of the movable object. The graphical element may be indicative of spatial environmental information. The spatial environmental information may comprise a relative distance and/or orientation between the movable object and another object within a physical environment where the movable object and the another object are located. In some cases, the graphical element may be configured to dynamically change on the display area as a position and/or an orientation of the movable object relative to the another object changes within the physical environment.

In some embodiments, the ROI data of the user may be obtained when the user is looking at the plurality of images of the VR environment or AR environment displayed in the display area. One or more images may be captured by an imaging sensor borne by a movable object. The one or more captured images may be fused together with the plurality of images of the VR environment or the AR environment displayed in the display area. The display device may be located remotely from the movable object. The movable object may be an aerial vehicle, a land vehicle, a vehicle traversing water body, a mobile phone, a tablet, a laptop, or a wearable device.

An aspect of the disclosure is directed to a method for determining a region-of-interest (ROI) of a user, the method comprising: dividing a display area into a plurality of zones; receiving data of the ROI, wherein the ROI is detected by a sensor; and identifying one or more ROI zones from the plurality of zones, wherein the ROI is within the one or more ROI zones.

In another aspect, a system for determining a region-of-interest (ROI) of a user is provided. The system comprises a sensor configured to detect the ROI on a display area; and one or more processors operably coupled to the sensor. The one or more processors, individually or collectively, are configured to divide the display area into a plurality of zones; receive data of the ROI, wherein the ROI is detected by the sensor; and identify one or more ROI zones from the plurality of zones, wherein the ROI is within the one or more ROI zones.

In another aspect, an apparatus for determining a region-of-interest (ROI) of a user is provided. The apparatus comprises one or more processors, individually or collectively, configured to divide a display area into a plurality of zones; receive data of the ROI, wherein the ROI is detected by a sensor; and identify one or more ROI zones from the plurality of zones, wherein the ROI is within the one or more ROI zones.

In another aspect, a non-transitory computer-readable medium storing instructions that, when executed, causes a computer to perform a method for determining a region-of-interest (ROI) of a user is provided. The method comprises dividing a display area into a plurality of zones; receiving data of the ROI, wherein the ROI is detected by a sensor; and identifying one or more ROI zones from the plurality of zones, wherein the ROI is within the one or more ROI zones.

In another aspect, a system for determining a region-of-interest (ROI) of a user is provided. The system comprises a zone dividing module configured to divide a display area into a plurality of zones; a data receiving module configured to receive data of the ROI, wherein the ROI is detected by a sensor; and a ROI zone identifying module configured to identify one or more ROI zones from the plurality of zones, wherein the ROI is within the one or more ROI zones.

Additional aspects of the disclosure are directed a method for processing image data. The method comprises obtaining region-of-interest (ROI) data of a user when one or more images are displayed in a display area, wherein the ROI data comprises a selection of one or more ROI zones of a plurality of predetermined zones that are used to divide the display area; obtaining image data captured by an imaging sensor; and processing the image data to obtain processed image data, said processed image data comprising (1) a first set of image data selected based on the ROI data compressed at a first compression rate and (2) a second set of image data distinct from the first set of image data compressed at a second compression rate different from the first compression rate.

In another aspect, a system for processing image data is provided. The system comprises a receiver configured to receive region-of-interest (ROI) data of a user collected when one or more images are displayed in a display area; and one or more processors operably coupled to the receiver, wherein the one or more processors, individually or collectively, are configured to: obtain the ROI data comprising a selection of one or more ROI zones of a plurality of predetermined zones that are used to divide the display area; obtain image data captured by an imaging sensor; and process the image data to obtain processed image data, said processed image data comprising (1) a first set of image data selected based on the ROI data compressed at a first compression rate and (2) a second set of image data distinct from the first set of image data compressed at a second compression rate different from the first compression rate.

In another aspect, an apparatus for processing image data is provided. The apparatus comprises one or more processors, individually or collectively, configured to: obtain region-of-interest (ROI) data of a user when one or more images are displayed in a display area, wherein the ROI data comprises a selection of one or more ROI zones of a plurality of predetermined zones that are used to divide the display area; obtain image data captured by an imaging sensor; and process the image data to obtain processed image data, said processed image data comprising (1) a first set of image data selected based on the ROI data compressed at a first compression rate and (2) a second set of image data distinct from the first set of image data compressed at a second compression rate different from the first compression rate.

In another aspect, a non-transitory computer-readable medium storing instructions that, when executed, causes a computer to perform a method for processing image data is provided. The method comprises obtaining region-of-interest (ROI) data of a user when one or more images are displayed in a display area, wherein the ROI data comprises a selection of one or more ROI zones of a plurality of predetermined zones that are used to divide the display area; obtaining image data captured by an imaging sensor; and processing the image data to obtain processed image data, said processed image data comprising (1) a first set of image data selected based on the ROI data compressed at a first compression rate and (2) a second set of image data distinct from the first set of image data compressed at a second compression rate different from the first compression rate.

In another aspect, a system for processing image data is provided. The system comprises a ROI data obtaining module configured to obtain region-of-interest (ROI) data of a user when one or more images are displayed in a display area, wherein the ROI data comprises a selection of one or more ROI zones of a plurality of predetermined zones that are used to divide the display area; an image data obtaining module configured to obtain image data captured by an imaging sensor; and an image processing module configured to process the image data to obtain processed image data, said processed image data comprising (1) a first set of image data selected based on the ROI data compressed at a first compression rate and (2) a second set of image data distinct from the first set of image data compressed at a second compression rate different from the first compression rate.

Additional aspects of the disclosure are directed to a method for obtaining image data. The method comprises obtaining region-of-interest (ROI) data of a user, wherein the ROI data is collected when one or more images are displayed on a display device, wherein the one or more images are captured using an imaging sensor; adjusting one or more parameters of the imaging sensor based on the ROI data; and capturing subsequent images using the imaging sensor with the adjusted parameters.

In another aspect, a system for obtaining image data is provided. The system comprises: a receiver configured to receive region-of-interest (ROI) data of a user collected when one or more images are displayed in a display area;

and one or more processors operably coupled to the receiver. The or more processors, individually or collectively, are configured to: obtain the ROI data, wherein the one or more images are captured using an imaging sensor; adjust one or more parameters of the imaging sensor based on the ROI data; and capture subsequent images using the imaging sensor with the adjusted parameters.

In another aspect, an apparatus for obtaining image data is provided. The apparatus comprises one or more processors, individually or collectively, configured to: obtain region-of-interest (ROI) data of a user, wherein the ROI data is collected when one or more images are displayed on a display device, wherein the one or more images are captured using an imaging sensor; adjust one or more parameters of the imaging sensor based on the ROI data; and capture subsequent images using the imaging sensor with the adjusted parameters.

In another aspect, a non-transitory computer-readable medium storing instructions that, when executed, causes a computer to perform a method for obtaining image data is provided. The method comprising: obtain region-of-interest (ROI) data of a user, wherein the ROI data is collected when the user is looking at one or more images displayed on a display device, wherein the one or more images are captured using an imaging sensor; adjusting one or more parameters of the imaging sensor based on the ROI data; and capturing subsequent images using the imaging sensor with the adjusted parameters.

In another aspect, a system for processing image data is provided. The system comprises: a ROI data obtaining module configured to obtain region-of-interest (ROI) data of a user, wherein the ROI data is collected when the user is looking at one or more images displayed on a display device, wherein the one or more images are captured using an imaging sensor; an imaging sensor adjusting module configured to adjust one or more parameters of the imaging sensor based on the ROI data; and an image capturing module configured to capture subsequent images using the imaging sensor with the adjusted parameters.

Additional aspects of the disclosure are directed to a method for transmitting image data based on region-of-interest (ROI) data of a user. The method comprises: obtaining region-of-interest (ROI) data, wherein the ROI data comprises a selection of one or more ROI zones of a plurality of predetermined zones that are configured to divide a display area; and transmitting processed image data to an image decoder configured to convert the processed image data for displaying in the display area, wherein the processed image data comprises (1) a first set of image data selected based on the ROI data compressed at a first compression rate and (2) a second set of image data distinct from the first set of image data compressed at a second compression rate different from the first compression rate.

In another aspect, a system for processing image data is provided. The system comprises: a receiver configured to receive region-of-interest (ROI) data of a user collected when one or more images are displayed in a display area; and one or more processors operably coupled to the receiver. The one or more processors, individually or collectively, are configured to: obtain the ROI data comprising a selection of one or more ROI zones of a plurality of predetermined zones that are used to divide a display area; and transmit processed image data to an image decoder configured to convert the processed image data for display in the display area, wherein the processed image data comprises (1) a first set of image data selected based on the ROI data compressed at a first compression rate and (2) a second set of image data distinct from the first set of image data compressed at a second compression rate different from the first compression rate.

In another aspect, an apparatus for processing image data is provided. The apparatus comprising one or more processors, individually or collectively, configured to: obtain region-of-interest (ROI) data, wherein the ROI data comprises a selection of one or more ROI zones of a plurality of predetermined zones that are configured to divide a display area; and transmit processed image data to an image decoder configured to convert the processed image data for displaying in the display area, wherein the processed image data comprises (1) a first set of image data selected based on the ROI data compressed at a first compression rate and (2) a second set of image data distinct from the first set of image data compressed at a second compression rate different from the first compression rate.

In another aspect, a non-transitory computer-readable medium storing instructions that, when executed, causes a computer to perform a method for processing image data is provided. The method comprises obtaining region-of-interest (ROI) data of a user, wherein the ROI data of the user comprises a selection of one or more ROI zones of a plurality of predetermined zones that are used to divide a display area; and transmitting processed image data to an image decoder configured to convert the processed image data for display in the display area, wherein the processed image data comprises (1) a first set of image data selected based on the ROI data compressed at a first compression rate and (2) a second set of image data distinct from the first set of image data compressed at a second compression rate different from the first compression rate.

In another aspect, a system for processing image data is provided. The system comprises a ROI data obtaining module configured to obtain region-of-interest (ROI) data of a user, wherein the ROI data of the user comprises a selection of one or more ROI zones of a plurality of predetermined zones that are used to divide the display area; and an image processing module configured to transmit processed image data to an image decoder configured to convert the processed image data for display in the display area, wherein the processed image data comprises (1) a first set of image data selected based on the ROI data compressed at a first compression rate and (2) a second set of image data distinct from the first set of image data compressed at a second compression rate different from the first compression rate.

Additional aspects of the disclosure are directed to a method for displaying image data. The method comprises: displaying a first group of images in a display area; obtaining region-of-interest (ROI) data of one or more region-of-interest (ROI) zones of a user, wherein the display area is divided into a plurality of predetermined zones, and wherein the one or more ROI zones are identified from the plurality of predetermined zones using one or more sensors; and displaying a second group of images converted from image data processed based on the ROI data, wherein an individual image of the second group of images comprises (1) a first set of pixels selected based on the ROI data, and (2) a second set of pixels that are distinct from the first set of pixels, wherein image data displayed in the first set of pixels are compressed at a first compression rate, and wherein image data displayed in the second set of pixels are compressed at a second compression rate higher than the first compression rate.

In another aspect, a system for displaying image data is provided. The system comprises: one or more sensors configured to detect one or more region-of-interest (ROI) zones of a user, wherein the one or more ROI zones are identified from a plurality of predetermined zones of a display area; and a display device operably coupled to the one or more sensors, the display device configured to: display a first group of images in the display area when the one or more sensors detect the one or more ROI zones; and display a second group of images converted from image data processed based on the ROI data, wherein an individual image of the second group of images comprises (1) a first set of pixels selected based on the ROI data, and (2) a second set of pixels that are distinct from the first set of pixels, wherein image data displayed in the first set of pixels are compressed at a first compression rate, and wherein image data displayed in the second set of pixels are compressed at a second compression rate higher than the first compression rate.

In another aspect, an apparatus for displaying image data is provided. The apparatus comprises one or more processors, individually or collectively, configured to: display a first group of images in a display area; obtain region-of-interest (ROI) data of one or more region-of-interest (ROI) zones of a user, wherein the display area is divided into a plurality of predetermined zones, and wherein the one or more ROI zones are identified from the plurality of predetermined zones using one or more sensors; and display a second group of images converted from image data processed based on the ROI data, wherein an individual image of the second group of images comprises (1) a first set of pixels selected based on the ROI data, and (2) a second set of pixels that are distinct from the first set of pixels, wherein image data displayed in the first set of pixels are compressed at a first compression rate, and wherein image data displayed in the second set of pixels are compressed at a second compression rate higher than the first compression rate.

In another aspect, a non-transitory computer-readable medium storing instructions that, when executed, causes a computer to perform a method for displaying image data is provided. The method comprises: displaying a first group of images in a display area; obtaining region-of-interest (ROI) data of one or more region-of-interest (ROI) zones of a user, wherein the display area is divided into a plurality of predetermined zones, and wherein the one or more ROI zones are identified from the plurality of predetermined zones using one or more sensors; and displaying a second group of images converted from image data processed based on the ROI data, wherein an individual image of the second group of images comprises (1) a first set of pixels selected based on the ROI data, and (2) a second set of pixels that are distinct from the first set of pixels, wherein image data displayed in the first set of pixels are compressed at a first compression rate, and wherein image data displayed in the second set of pixels are compressed at a second compression rate higher than the first compression rate.

In another aspect, a system for displaying image data is provided. The system comprises a sensor data obtaining module configured to obtain region-of-interest (ROI) data of one or more region-of-interest (ROI) zones of a user, wherein the display area is divided into a plurality of predetermined zones, and wherein the one or more ROI zones are identified from the plurality of predetermined zones using one or more sensors; and an image displaying module configured to display a first group of images in a display area when the one or more sensors detect the one or more ROI zones of the user; and display a second group of images converted from image data processed based on the ROI data, wherein an individual image of the second group of images comprises (1) a first set of pixels selected based on the ROI data, and (2) a second set of pixels that are distinct from the first set of pixels, wherein image data displayed in the first set of pixels are compressed at a first compression rate, and wherein image data displayed in the second set of pixels are compressed at a second compression rate higher than the first compression rate.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 3A illustrates an eye-tracking system for determining a ROI of a user, in accordance with some embodiments.

FIGS. 3B and 3C illustrate the mapping of eye movement to positions on a display area as a user looks at different portions of the display area, in accordance with some embodiments.

DETAILED DESCRIPTION

Figure 1B:
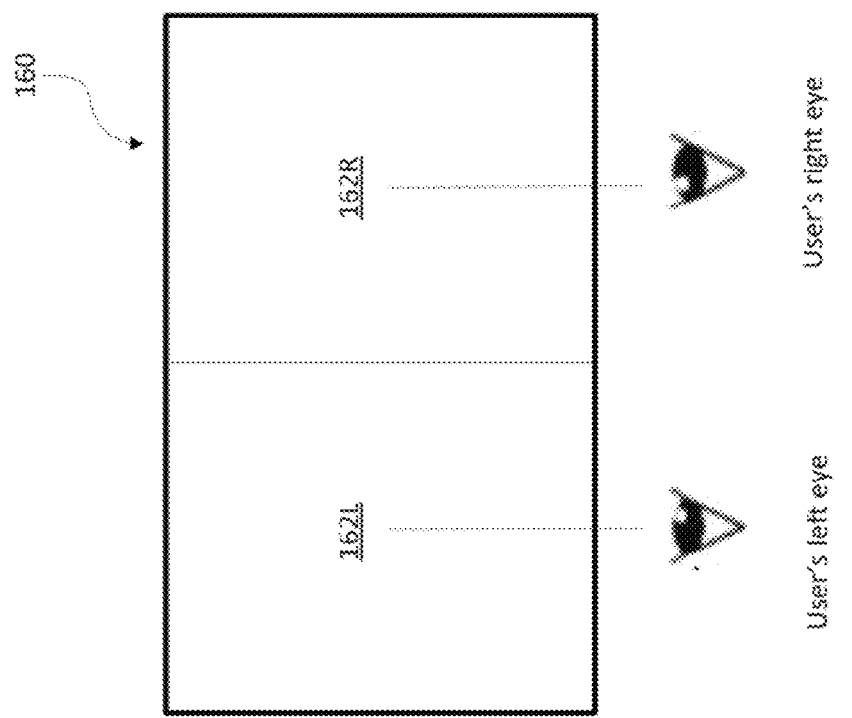
FIG. 1B illustrates a display area comprising a left eye display and right eye display for displaying image data, in accordance with some embodiments.

A need exists for processing the images captured by the aerial vehicle based on region-of-interest (ROI) of a user to save transmission bandwidth and other resources. Images captured may include the capture of still images and/or videos. Additionally, it is desirable to have dynamic user interaction for controlling aerial photography. The ROI of the user may be dynamically tracked using an eye-tracking system. The eye-tracking system may be incorporated onto a display device. The display device may be configured to display image data (e.g., the captured still images and/or video) on a display area. The display device may also be configured to display one or more images of a virtual reality (VR) environment or an augmented reality (AR) environment on the display area. In some instances, the display device may be configured to be worn by a user. For example, the display device may be a pair of glasses, goggles, or head-mounted display. The display device may include any type of wearable computer or device incorporating either augmented reality (AR) or virtual reality (VR) technologies. The display device may also comprise one or more sensors configured to obtain region-of-interest (ROI) data of the user when the user is wearing the display device and looking at the one or more images of the VR environment or the AR environment displayed on the display area. The display device may further comprise one or more processors individually or collectively configured to (1) select, based on the ROI data, one or more ROI zones from a plurality of zones that are used to divide the one or more images on the display area, and (2) effect display of the one or more ROI zones on the display area to the user. Alternatively and/or in addition to a wearable display device, the ROI of the user may be dynamically determined using a touch screen or any other suitable sensory system as discussed herein.

ROI data may comprise location and/or size of an area on the display where user is interested in. The ROI data may be transmitted to an image encoder borne by the aerial vehicle for processing the captured images. For example, the image encoder may compress the image data corresponding to the ROI region using different strategies (e.g., compression rate, contrast, hue, etc.) to have enhanced image quality compared to the image data corresponding to the non-ROI region. Thus the image encoder does not need to process the entire image using a unified strategy. This could provide sufficient image quality in the ROI of the user, while effectively reduce data size for the non-ROI portion of the image.

Alternatively or additionally, the ROI data may be transmitted to the imaging device borne by the aerial vehicle, such that the imaging device may adjust one or more parameters of the imaging device for capturing and/or processing the image data accordingly. Advantageously, the approaches described herein may reduce the file size and effectively save the transmission bandwidth and other resources. Because the ROI of the user can be dynamically tracked in real-time with or without any direct user interaction, the approaches described herein may further provide improved user experience in dynamic interaction with aerial photography.

Figure 1A:
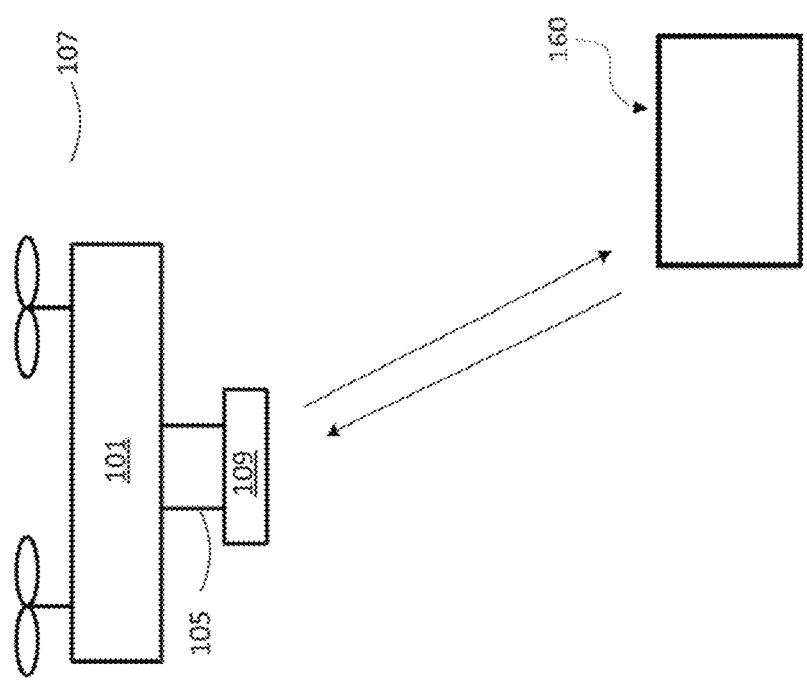
FIG. 1A illustrates tracking a region-of-interest (ROI) of a user while the user is looking at images taken from a camera on board an unmanned aerial vehicle (UAV), in accordance with some embodiments.

FIG. 1A is a schematic view illustrating tracking a region-of-interest (ROI) of a user 108 while the user is looking at images taken from a camera on board an unmanned aerial vehicle (UAV) 107, in accordance with some embodiments. The user may be located at a remote control terminal which is configured to communicate with the UAV. The user may view images captured by the imaging device in real time, and send control signals using a control device.

Any description herein of a UAV may apply to any type of aerial vehicle, and vice versa. The aerial vehicle may or may not be unmanned. Similarly, any description herein of a UAV may apply to any type of movable object, and vice versa. A movable object may be a vehicle capable of self-propelled movement. The vehicle may have one or more propulsion units that may be capable of permitting the vehicle to move within an environment. A movable object may be capable of traversing on land or underground, on or in the water, within the air, within space, or any combination thereof. The movable object may be an aerial vehicle (e.g., airplanes, rotor-craft, lighter-than air vehicles), land-based vehicle (e.g., cars, trucks, buses, trains, rovers, subways), water-based vehicles (e.g., boats, ships, submarines), or space-based vehicles (e.g., satellites, shuttles, rockets). The movable object may be manned or unmanned.

A UAV may have a UAV body 101. The UAV body may optionally include a housing that may enclose one or more components of the UAV. For instance, a housing may enclose one or more electrical components of the UAV. Examples of electrical components may include, but are not limited to, a flight controller of the UAV, an inertial measurement unit, a power supply unit, a memory storage unit, one or more processors, a navigational unit (e.g. GPS), a communication unit, one or more electronic speed controls (ESCs), one or more actuators, or one or more sensors. Examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy). The UAV body may support one or more components, such as one or more of the electrical components. The one or more components may be within a housing, outside a housing, embedded into a housing, or any combination thereof.

The UAV body may be a central body. Optionally one or more arms may extend from the central body. An arm may support one or more propulsion units that may aid the UAV in flight. The propulsion units may include one or more rotors that may generate lift for the UAV. The propulsion units may include a rotor blade and a corresponding actuator that may effect rotation of the rotor blades about an axis. The lift may be in the direction of the axis. In some embodiments, one or more, two or more, three or more, four or more, five or more, six or more, seven or more, eight or more, ten or more, twelve or more, twenty or more, or thirty or more arms may extend from the central body. Each arm may have one or more, two or more, three or more, four or more, or five or more propulsion units supported by the arm.

The UAV may have any other characteristic as described in greater detail elsewhere herein. Any description herein of a UAV may apply to any movable object having a characteristic as described in greater detail elsewhere herein.

In some embodiments, the UAV can include a carrier 105 and a payload 109. The carrier may permit the payload to move relative to the UAV. For instance, the carrier may permit the payload to rotate around one, two, three, or more axes. For instance, the payload may move about a roll, yaw, and/or pitch axes. Alternatively or additionally, the carrier may permit the payload to move linearly along one, two, three, or more axes. The axes for the rotational or translational movement may or may not be orthogonal to each other.

In alternative embodiments, the payload may be rigidly coupled to or connected with the UAV such that the payload remains substantially stationary relative to the UAV. For example, the carrier that connects the UAV and the payload may not permit the payload to move relative to the UAV. Alternatively, the payload may be coupled directly to the UAV without requiring a carrier.

In some embodiments, the payload can include one or more sensors for surveying or tracking objects in the surrounding environment. Examples of such a payload may include an image capturing device or imaging device (e.g., camera or camcorder, infrared imaging device, ultraviolet imaging device, or the like), an audio capture device (e.g., a parabolic microphone), an infrared imaging device, or the like. Any suitable sensor(s) can be incorporated into the payload 109 to capture any visual, audio, electromagnetic, or any other desirable signals. The sensors can provide static sensing data (e.g., a photograph) or dynamic sensing data (e.g., a video). The sensors may capture sensing data continuously in real time or at high frequencies. In some instances, the payload may be a camera that may capture images at frequencies of 10 Hz, 20 Hz, 30 Hz, 40 Hz, 50 Hz, 60 Hz, 70 Hz, 80 Hz, 90 Hz, 100 Hz, or higher.

In some embodiments, the payload may include multiple imaging devices, or an imaging device with multiple lenses and/or image sensors. The payload may be capable of taking multiple images substantially simultaneously. The multiple images may aid in the creation of a 3D scene, a 3D virtual reality environment, a 3D augmented reality environment, a 3D map, or a 3D model. For instance, a right image and a left image may be taken and used for stereo-mapping. A depth map may be calculated from a calibrated binocular image. Any number of images (e.g., 2 or more, 3 or more, 4 or more, 5 or more, 6 or more, 7 or more, 8 or more, 9 or more) may be taken simultaneously to aid in the creation of a 3D scene/virtual environment/model, and/or for depth mapping. The images may be directed in substantially the same direction or may be directed in slightly different directions. In some instances, data from other sensors (e.g., ultrasonic data, LIDAR data, data from any other sensors as described elsewhere herein, or data from external devices) may aid in the creation of a 2D or 3D image or map.

The UAV can be configured to receive control data from the user. A remote control terminal can be configured to provide the control data. The control data may be generated based on input from the user operating the remote terminal. Alternatively or additionally, the control data may be provided by other non-user sources such as a remote or local data store, other computing devices operative connected to the remote terminal, or the like. The control data can be used to control, directly or indirectly, aspects of the UAV, the payload, and/or the carrier. In some embodiments, the control data can include navigation commands for controlling navigational parameters of the movable object such as the position, speed, orientation, or attitude of the UAV. The control data can be used to control flight of a UAV. The control data may affect operation of one or more propulsion systems that may affect the flight of the UAV.

In some embodiments, the control data can include commands for controlling individual components onboard or carried by the UAV. For instance, the control data may include information for controlling the operations of the carrier. For example, the control data may be used to control an actuation mechanism of the carrier so as to cause angular and/or linear movement of the payload relative to the movable object. As another example, the control data may be used to adjust one or more operational parameters for the payload such as taking still or moving pictures, zooming in or out, turning on or off, switching imaging modes, change image resolution, changing focus, changing depth of field, changing exposure time, changing speed of lens, changing viewing angle or field of view, or the like. In other embodiments, the control data may be used to control other components onboard the UAV such as a sensing system (not show), communication system (not shown), and the like.

The UAV can be configured to provide, and the remote terminal can be configured to receive data. In various embodiments, the data received by the remote terminal may include raw data (e.g., raw image data) and/or processed data (e.g., compressed image data). For example, the data can include raw image data acquired by a camera onboard the UAV and/or processed data such as compressed image data generated onboard the UAV based on the images captured by the payload. For example, real-time or nearly real-time video can be streamed from the UAV and/or the payload to the remote terminal.

In some embodiments, the remote terminal can be located at a location distant or remote from the UAV. The remote terminal can be disposed on or affixed to a support platform. Alternatively, the remote terminal can be a handheld or wearable device. For example, the remote terminal can include smartphones/cellphones, tablets, personal digital assistants (PDAs), laptop computers, desktop computers, media content players, video gaming station/system, virtual reality systems, augmented reality systems, wearable devices (e.g., watches, glasses, gloves, headgear (such as hats, helmets, virtual reality headsets, augmented reality headsets, virtual reality (VR) glasses or goggles, augmented reality (AR) glasses or goggles, head-mounted devices (HMD), headbands), pendants, armbands, leg bands, shoes, vests), gesture-recognition devices, microphones, or any electronic device capable of providing or rendering image data.

The remote terminal can be configured to display data received from the UAV via a display device 160. The display device may be provided as part of the remote terminal.

Alternatively, the display device may be separate from the remote terminal. In some cases, the display device may be operably coupled to the remote terminal. The display device may include a display area 162 for displaying the data received from the UAV. The displayed data may include images (e.g., still images and videos) acquired by an imaging device carried by the UAV and/or processed data. The displayed data may also include other information that may be displayed separately from the image data or superimposed on top of the image data. In some embodiments, the displayed data may include a plurality of images of a VR environment or an AR environment. In the AR environment, a computer-generated environment may be superimposed over the images acquired by the imaging device carried by the UAV. In the VR environment, the environment may be partially or completely computer-generated based in part on the images acquired by the imaging device carried by the UAV. The images captured by the imaging device may be fused together with the plurality of images in the VR environment or the AR environment.

In some embodiments, the image data may be provided in a 3D virtual environment that is displayed on the display device (e.g., virtual reality glasses or augmented reality glasses). The 3D virtual environment may optionally correspond to a 3D map. The virtual environment may comprise a plurality of points or objects that can be manipulated by a user, for example by the user's eye gaze movement. The user can manipulate the points or objects through a variety of different actions in the virtual environment. Examples of those actions may include selecting one or more points or objects, drag-and-drop, translate, rotate, spin, push, pull, zoom-in, zoom-out, etc. Any type of movement action of the points or objects in a three-dimensional virtual space may be contemplated. A user at a remote terminal can manipulate the points or objects in the virtual environment by focusing on different regions of interest (ROI), to actively select one or more areas that are of interest to the user.

In some embodiments, the image data may be provided on the display device in a first person view (FPV). Other types of views may be presented in alternative or in conjunction with the FPV. For instance, in some embodiments, a map view may include a 3D map instead of a 2D map. The 3D map may be alterable to view the 3D environment from various angles. In some embodiments, the 3D environment may comprise a plurality of virtual objects. The virtual objects may be graphical solid objects or graphical wireframes. The virtual objects may comprise points or objects that may be of interest to a user. Points or objects that may be of less interest to the user may be omitted from the 3D virtual environment to reduce object clutter and to more clearly delineate points/objects of interest, for example by using one or more embodiments described elsewhere herein. The reduced clutter makes it easier for the user to select or identify a desired point or object of interest from the 3D virtual environment, for example by the user shifting his eye focus on the desired point or object of interest.

In some embodiments, image data may be displayed in substantially real-time as the images are generated and/or transmitted to the remote terminal. For instance, the images and/or other data may be displayed within 10 seconds, 5 seconds, 3 seconds, 2 seconds, 1 second, 0.5 seconds, 0.1 seconds of being captured by the payload. In other embodiments, the display may be provided after some delay. In some embodiments, the panoramic image and/or other data may be stored, transmitted, or otherwise processed by the remote terminal.

The display device may be a portable optical visual system. The display device may be cordless. Alternatively, the display device may be wired to the remote terminal, or to another external device. In some embodiments, the display device may be a pair of VR glasses or AR glasses. The VR glasses or AR glasses may be made relatively compact. For example, the VR glasses or AR glasses may be foldable and/or flattened into a 2-dimensional shape for easy storage and portability. In some cases, the display device may be a VR or an AR head-mounted display (HMD).

Referring to FIG. 1B, the display device 160 may comprise the display area 162 for displaying image data. In some embodiments, the display area may be configured to display a plurality of images of a VR environment or an AR environment. To display the images of the VR environment or the AR environment, the display area 162 may be partitioned into a left eye display 162L for displaying left eye images and a right eye display 162R for displaying right eye images. When a user is wearing the display device, the user's left eye may see a left eye image displayed on display 162L, and the user's right eye may see a right eye image displayed on display 162R. The left and right eye images may be used to generate a 3-dimensional stereoscopic view of the VR environment or the AR environment.

The remote terminal can be configured to receive user input via an input device. The input device may include a joystick, keyboard, mouse, touchscreen, stylus, microphone, image or motion sensor, inertial sensor, and the like. The display may be the same device as the input device. Alternatively, the display may be a separate device from the input device. Yet in another embodiments, the display may be a component of the input device.

Any suitable user input can be used to interact with the terminal, such as manually entered commands, voice control, gesture control, or position control (e.g., via a movement, location or tilt of the terminal). For instance, the remote terminal may be configured to allow a user to control a state of the movable object, carrier, payload, or any component thereof by manipulating a joystick, changing an orientation or attitude of the remote terminal, interacting with a graphical user interface using a keyboard, mouse, finger, or stylus, or by using any other suitable methods. For example, the remote terminal may be configured to allow a user to control various aspects of the panoramic mode of operation as discussed herein. The remote terminal may also comprise an eye-tracking device including a sensor for tracking eye-gaze of the user while the user is viewing images on the display. The tracked eye-gaze may be used for determining user's region-of-interest (ROI) in real time. The determined ROI may be sent to the payload on board the UAV. For example, an image encoder as discussed elsewhere herein may adjust image compression strategy based on the ROI. An imaging device on board the UAV may also adjust its parameters based on the ROI for capturing the images.

Figure 1C:
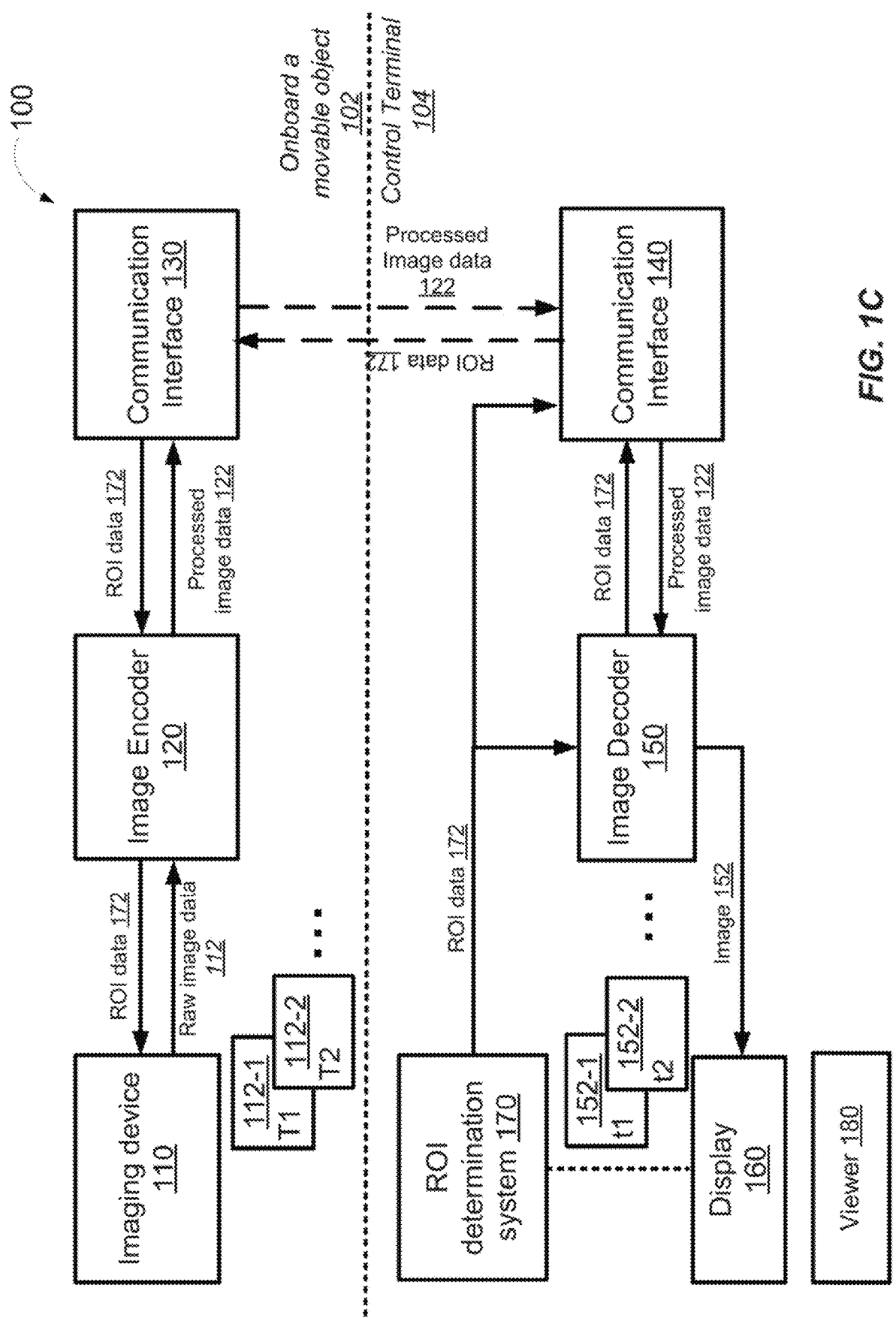
FIG. 1C illustrates a block diagram of a system for processing images using a region-of-interest (ROI) of a user, in accordance with some embodiments.

FIG. 1C shows a diagram 100 illustrating examples of components for processing images based a region-of-interest (ROI) of a user, in accordance with embodiments. The diagram 100 comprises a movable object side 102 (e.g. a UAV side) and a control terminal side 104 (e.g., located remotely from the movable object.) On the movable object side 102, an imaging device 110 may be provided on board the movable object and configured to collect raw image data 112. The imaging device may alternatively be implemented as a stand-alone device and need not be provided on a movable object.

An imaging device as used herein may serve as an image capture device. An imaging device may be a physical imaging device. An imaging device can be configured to detect electromagnetic radiation (e.g., visible, infrared, and/or ultraviolet light) and generate image data based on the detected electromagnetic radiation. An imaging device may include a charge-coupled device (CCD) sensor or a complementary metal-oxide-semiconductor (CMOS) sensor that generates electrical signals in response to wavelengths of light. The resultant electrical signals can be processed to produce raw image data 112. The raw image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

In some embodiments, the imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like.

The imaging device may capture a raw image or a sequence of raw images (e.g., raw image data 112-1 captured at T1, raw image data 112-2 captured at T2 . . . whereby time T2 may be a point in time occurring after time T1) at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution. Alternatively or additionally, the images captured by the imaging device may have the same or different filed of views from each other.

The imaging device may capture a sequence of raw images at a specific capture rate. In some embodiments, the sequence of images may be captured standard video frame rates such as about 24 p, 25 p, 30 p, 48 p, 50 p, 60 p, 72 p, 90 p, 100 p, 120 p, 300 p, 50 i, or 60 i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The imaging device may have adjustable parameters. Under differing parameters, different images may be captured by the imaging device while subject to identical external conditions (e.g., location, lighting). The adjustable parameter may comprise exposure (e.g., depth of field, exposure time, shutter speed, aperture, film speed), zoom, gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

Still referring to FIG. 1C, the imaging device may be configured to raw capture image data of one or more objects. The raw image data may correspond to, for example, still images or video frames of the plurality of objects. The objects may include any physical object or structure that can be optically identified and/or tracked in real-time by the visual tracking system. Optical tracking has several advantages. For example, optical tracking allows for wireless 'sensors', is less susceptible to noise, and allows for many objects (e.g., different types of objects) to be tracked simultaneously. The objects can be depicted in still images and/or video frames in a 2D or 3D format, can be real-life and/or animated, can be in color, black/white, or grayscale, and can be in any color space. The objects may be stationary. Alternatively, the objects may be movable and may be moving or stationary at any given point in time.

As shown in FIG. 1C, the imaging device may transmit the raw image data to an image encoder 120 to be encoded in processed image data 122 (e.g., a plurality of image signals.) The image encoder may be a stand-alone device borne by the movable object or a component of the imaging device. Although not shown, alternatively the image encoder may be off board the UAV, e.g., to keep the UAV more compact and light weighted. In some embodiments, the raw image data and the corresponding processed image data may comprise a plurality of color images, and the plurality of pixels may comprise color pixels. In other embodiments, the raw image data and the corresponding processed image data may comprise a plurality of grayscale images, and the plurality of pixels may comprise grayscale pixels. In some embodiments, each pixel in the plurality of grayscale images may have a normalized grayscale value.

An encoder may be configured to compress the digital signals in an attempt to reduce the size of the data without significant adverse effects on the perceived quality of the image. The data compression may comprise image compression and/or video compression. The data compression may include encoding information using fewer bits than the original format. The data compression can be lossy or lossless. Lossless compression may reduce bits by identifying and eliminating statistical redundancy. No information is lost in lossless compression. Lossy compression may reduce bits by identifying certain information and removing/truncating it. This data compression is especially advantageous when the bandwidth for data transmission between the movable object and a control terminal is limited. The data compression can also be desirable for saving resource usage, such as data storage space. For example, JPEG image compression may round off nonessential bits of information to obtain trade-off between preserving information and reducing size. MPEG compression may further add inter-frame encoding to take advantage of the similarity of consecutive frames in a motion sequence.

The compression quality may include a quantization parameter (QP) value which is achieved by compressing a range of values to a single quantum value. For example, QP value may be used to reduce the number of colors used in an image. QP value may also be used to reduce the information from high frequency components of image data. In some instances, a higher QP value may indicate a higher compression rate applied to the image data which results in bigger data loss, and a lower QP value may indicate a lower compression rate applied to the image data which results in smaller data loss. After compression, the image data compressed using a higher QP value may have lower resolution, lower brightness, lower contrast, less detailed color information, and/or losing other image qualities. On the other hand, the image data compressed using a lower QP value may have higher resolution, higher image brightness, higher image contrast, more detailed color information, and/or other enhanced image qualities. Other suitable compression methods and algorithms may also be used.

The raw image data and/or the processed image data may be directly transmitted to the control terminal without being stored in any form of medium. In some alternative embodiments, the raw image data captured by the imaging device and/or the processed image data compressed by the encoder may be stored in a media storage (not shown) before the image data is transmitted to the control terminal. The media storage may also be borne by the movable object. The media storage can be any type of storage medium capable of storing image data of a plurality of objects. The media storage can be provided as a CD, DVD, Blu-ray disc, hard disk, magnetic tape, flash memory card/drive, solid state drive, volatile or non-volatile memory, holographic data storage, and any other type of storage medium. As another example, the media storage can be a web server, an enterprise server, or any other type of computer server. The media storage can be computer programmed to accept requests (e.g., HTTP, or other protocols that can initiate data transmission) from one or more devices at the control terminal and to serve the control terminal with requested image data. In addition, the media storage can be a broadcasting facility, such as free-to-air, cable, satellite, and other broadcasting facility, for distributing image data. The media storage may also be a server in a data network (e.g., a cloud computing network). In some embodiments, the media storage may be located on-board the imaging device, the image encoder, and/or the movable object. In some embodiments, the media storage may be located on the control terminal, such as a remote controller, a ground station, a server, etc. Any arrange or combination of the above components may be contemplated.

As shown in FIG. 1C, the processed image data may be transmitted from a communication interface 130 on the movable object side towards a communication interface 140 on the control terminal side. In some embodiments, the imaging device, the encoder, and the communication interface may be mounted or co-located on a movable object, such as a vehicle that is capable of traveling in the air, on land, on water, or within a water body. Examples of vehicles may include an aerial vehicle (e.g., UAVs, airplanes, rotorcraft, lighter-than air vehicles), a land-bound vehicle (e.g., cars, trucks, buses, trains, rovers, subways), a water-bound vehicle (e.g., boats, ships, submarines), or space-based vehicles (e.g., satellites, shuttles, rockets). A movable object may be capable of traversing on land or underground, on or in the water, within the air, within space, or any combination thereof. In some embodiments, the movable object may be a mobile device, a cell phone or smartphone, a personal digital assistant (PDA), a computer, a laptop, a tablet PC, a media content player, a video game station/system, wearable devices such as a virtual reality headset or a head mounted device (HMD), or any electronic device capable of capturing, providing or rendering image data, and/or identifying or tracking a target object based on the image data. The movable object may be self-propelled, can be stationary or moving, and may change orientation (e.g., attitude) over time.

The control terminal may be located remotely from the movable object. For example, the control terminal may be located on the ground. The control terminal may transmit various control signals to the movable object via an uplink, e.g., wireless link. The wireless link may include a RF (radio frequency) link, a Wi-Fi link, a Bluetooth link, a 3G link, or a LTE link. The wireless link may be used for transmission of control data over long distances. For example, the wireless link may be used over distances equal to or greater than about 5 m, 10 m, 15 m, 20 m, 25 m, 50 m, 100 m, 150 m, 200 m, 250 m, 300 m, 400 m, 500 m, 750 m, 1000 m, 1250 m, 1500 m, 1750 m, 2000 m, 2500 m, 3000 m, 3500 m, 4000 m, 4500 m, 5000 m, 6000 m, 7000 m, 8000 m, 9000 m, or 10000 m. The communication interface may be a component of the imaging device or the imaging encoder. For example, the imaging device and/or the image encoder may comprise one or more receivers. Alternatively or in addition, a receiver may be located on a movable object. The bandwidth of the communication between the UAV and the control terminal may be in a range from about 10 Kbps to about 1M bps. Different image data compression strategies as discussed elsewhere herein may be used depending on the current communication bandwidth. For example, the whole image may be compressed uniformly when the communication bandwidth is fast enough to support real-time image transmission. However, when the communication bandwidth drops to a certain level, it may be switched to a different image compression strategy where different areas of an image may be compressed using different rates.

As shown in FIG. 1C, at the control terminal side, an image decoder 150 may be used to decompress the processed image data processed by the image encoder. Images processed by the image decoder may be shown on a display device 160 to be viewed by a viewer 180. The images may be shown on the display in real time as the imaging device on the movable object is taking more images of one or more objects. The display may be a device appropriate for displaying images or videos, for example, a LCD (Liquid Crystal Display), a CRT (Cathode Ray Tube), an OLED (Organic Light Emitting Diodes), or a Plasma. The display may display the image based on the image data generated by the image processor. In some embodiments, the display may be a local display device of the imaging system. In some instances, the display may be provided on a movable object or the stationary object carrying the imaging system. In some instances, the display may be provided on a mobile device, such as a cellphone, PDA, tablet, or controller. Alternatively, the display may be a display device remote to the imaging system. In some instances, the display may be a remote terminal such as a smartphone, a tablet, a laptop or a personal computer, which receives the image data from the imaging system via a wireless link.

Due to the limited transmission bandwidth between the movable object and the control terminal, it is desirable to process different regions of an image using different compression rates, such that the viewer may see his or her interested region clearly enough. As shown in FIG. 1C, a ROI determination system 170 is coupled with the display for determining the ROI of the viewer. The ROI determination system may be a stand-alone system, and the ROI determination system may be connected to the display either wirelessly or in via wired connection (e.g., via USB). Alternatively, the ROI determination system may be one or more components of the display. In other embodiments, the ROI determination system and the display may be provided on a single device, e.g., a mobile device as discussed herein.

Figure 2:
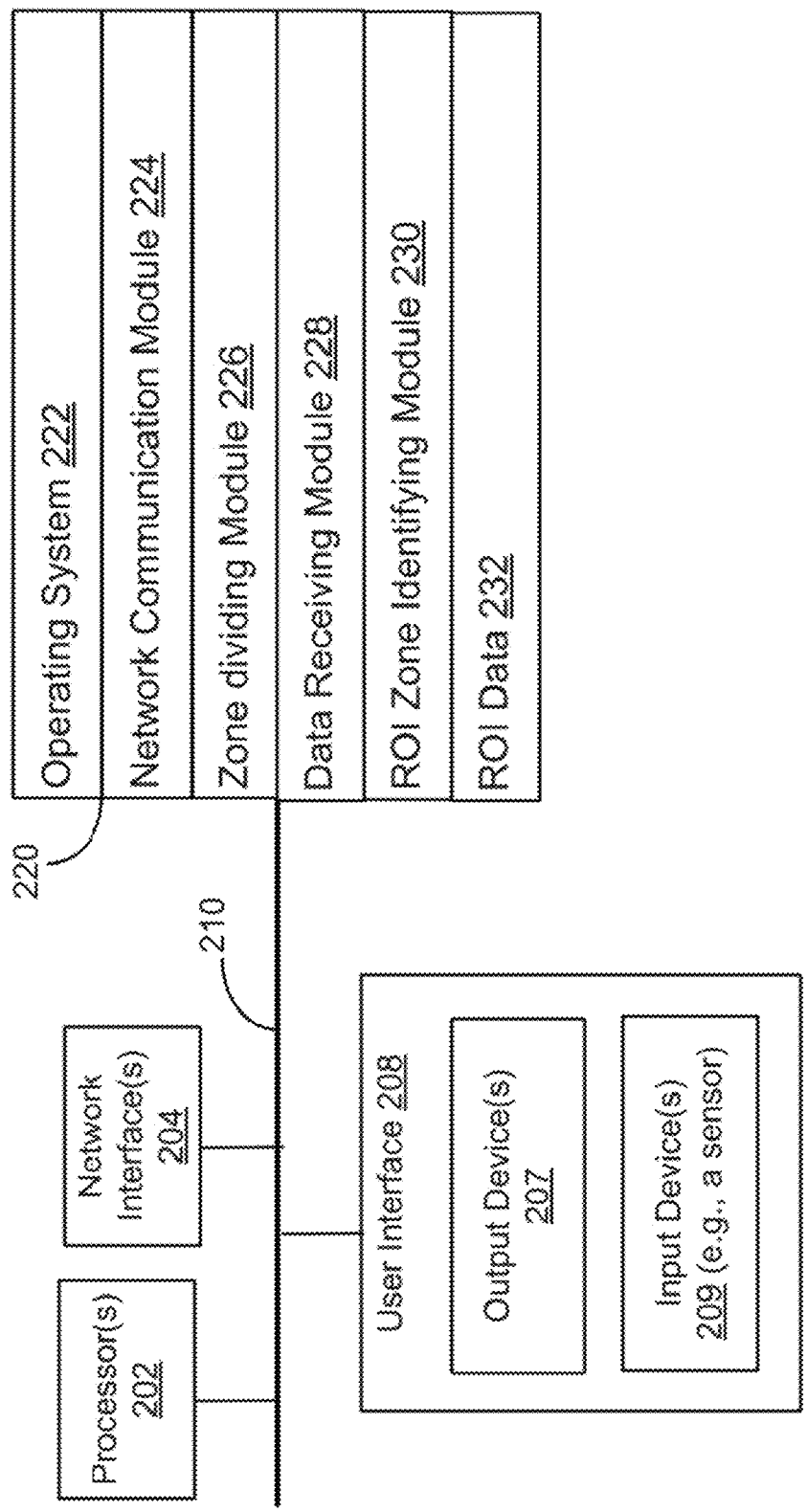
FIG. 2 illustrates a ROI determination system, in accordance with some embodiments.

FIG. 2 is a block diagram illustrating a representative region-of-interest (ROI) determination system, in accordance with some embodiments. The ROI determination system may be an eye-tracking system configured to track user's eye-gaze for determining the user's ROI. The ROI determination system may be a finger touch sensing system configured to recognize user's finger and/or palm touch on a touchscreen. The ROI determination system may alternatively be a motion tracking system configured to track motions of any part of a user's body to recognize user's ROI.

The ROI determination system may comprise one or more processors 202, one or more network interfaces 204, memory 220, and one or more communication buses 210 for interconnecting these components. The ROI determination system may also comprise a user interface 208. The user interface may include one or more output devices 207 and/or one or more input devices 209. The output devices may include one or more speakers and/or one or more visual displays. The input devices may include a keyboard, a mouse, a voice-command input unit or microphone, a sensor, a touch screen display, a touch-sensitive input pad, a camera, a gesture capturing camera, or other input buttons or controls. The sensor may be configured to detect the ROI on the display. For example, the sensor may include a vision sensor, a motion sensor, an infrared sensor, and/or a capacitive sensor. The sensor may be used to collect ROI data of the user when one or more images are shown to the user on the display.

The memory may include high-speed random access memory, such as DRAM, SRAM, DDR RAM, or other random access solid state memory devices; and optionally, includes non-volatile memory, such as one or more magnetic disk storage devices, one or more optical disk storage devices, one or more flash memory devices, or one or more other non-volatile solid state storage devices. Optionally, the memory may include one or more storage devices remotely located from one or more processors. The memory may include a non-transitory computer readable storage medium. In some embodiments, the memory, or the non-transitory computer readable storage medium of the memory may store the following programs, modules, and data structures, or a subset or superset thereof: an operating system 222, a network communication module 224, a zone dividing module 226, a data receiving module 228, and a ROI zone identifying module 230. In some embodiments, the operating system may include procedures for handling various basic system services and for performing hardware dependent tasks. The network communication module may be used for connecting the ROI determination system to other computing devices (e.g., the display device 160) via one or more network interfaces. The zone dividing module may be configured to divide a display area on the display device 160 into a plurality of zones. The data receiving module may be configured to receive data of the ROI from the sensor. The ROI zone identifying module may be configured to identify one or more ROI zones that include the ROI of the user from the plurality of zones. The ROI determination system may also comprise ROI data 232. The ROI data may include ROI data associated with one or more user accounts. For example, the ROI data may include user account data (e.g., login credentials, user profile data, etc.) and eye-tracking calibration data associated with respective user accounts.

FIG. 3A illustrates an eye-tracking system 300 for determining a ROI of a user, in accordance with embodiments. The eye-tracking system is illustrated as an example of the ROI determination system as discussed with references to FIGS. 1-2. The eye-tracking system may include, but is not limited to, a camera 312 and one or more processors 314. The camera may be positioned so as to capture movement of at least one of the user's eyes. For example, the camera may be located near the display device, attached to the display device, or separate from the display device. The eye-tracking system may be operably coupled to the display device 160 as discussed elsewhere herein. When the user is looking at one or more images displayed in the display area 162, the display area may produce a corneal reflection 332 on the user's eye. The eye-gaze of the user may be determined by tracking the position of the center of the pupil 334. The camera of the eye-tracking system may be used to collect data related to movement of at least one eye of the user. When the user is looking at different regions on the display, the center of pupil changes, while the corneal reflection may be used as a reference point for eye gaze estimation. Thus the eye gaze location may be determined based on a relative position between the center of the pupil and the screen reflection corresponding to the display area reflected on a corresponding eye of the user. For example, by measuring the vector 336 between the center of the pupil and the corneal reflection, the user's eye gaze may be determined. When the user moves his or her head, the position of the corneal reflection may change. Thus the eye-tracking system may further track head movement of the user to determine position information of the screen reflection on the user's eye. In some embodiments, the eye-tracking system may not need to track the head movement of the user to determine position information of the screen reflection on the user's eye. For example, when the display device is a pair of VR glasses or AR glasses, the eye-tracking system can determine position information of the screen reflection on the user's eye, by tracking the user's eye gaze movement as the user's eye focuses between different regions on the display even when the user is not moving his or her head.

In some embodiments, before performing the eye-tracking of a user, a calibration process of a user is performed using the eye-tracking system to determine a relationship between the corneal reflection and the pupil location. For example during calibration, the user may be required to look at certain predetermined locations on the display screen, and the location data of the corneal reflection and the center of the pupil may be collected by the camera and one or more processors. In some embodiments, this relationship between the corneal reflection and the pupil location may be user specific. After calibration, the eye-tracking system may track a location of a screen reflection on at least one eye of the user and a location of a corresponding pupil of the user. The eye-tracking system may then extrapolate the eye gaze location within the display area using the relationship determined from the calibration process.

As shown in FIG. 3A, the eye-gaze point 320 may be determined using the eye-tracking system when the user is looking at one or more images shown on the display area 162 of the display device 160. The eye-gaze point may be associated with an eye (e.g., left eye or right eye) of the user. The display area may be on a screen. The eye-gaze point may be determined based on a corneal reflection 332 of the display area (or screen) on the user's eye. The display area may be provided on a light-emitting diode (LED) screen, OLED screen, liquid crystal display (LCD) screen, plasma screen, or any other type of screen. The display area may be configured to show a graphical user interface (GUI). The GUI may show one or more images. In some cases, the one or more images may depict a virtual reality (VR) environment or an augmented reality (AR) environment. In some embodiments, the one or more images may be real-time images captured by the movable object as discussed elsewhere herein. The display area may comprise a 2-dimensional array of pixels. Each pixel may have a set of pixel coordinates. The location of the eye-gaze point may be determined to have a set of 2-dimensional coordinates on the display area. Alternatively or additionally, the location of the eye-gaze point may be determined to correspond to pixel coordinates of the images shown on the display. ROI data may be associated with one or more sets of coordinates selected from the plurality of coordinates (e.g., 2-D coordinates on the display area or pixel coordinates).

A ROI 321 may be determined based on the eye-gaze point. For example, the ROI may be defined to be an area having a certain shape and size centered at the estimated eye-gaze point. For example, the ROI may be circular, rectangular, square, triangular, other polygonal, or any other suitable shaped. The ROI may include continuous or discontinuous regions. The size of the ROI may be predetermined by the user or the system. For example, the ROI may be predetermined by the user to be a circular shaped region with a certain radius. In some embodiments, the region 322 immediately outside the ROI may be determined to be a transitional region. The size and shape of the transitional region may also be predetermined by the user or the system. The rest of the display area 324 may be determined to be non-ROI region. In some embodiments, there may be more than one region between the ROI and non-ROI to provide smooth transition from the ROI to the non-ROI regions. In some embodiments, the eye-tracking system may have a sampling frequency of at least 25 Hz, 50 Hz, 75 Hz, 100 Hz, 250 Hz, 500 Hz, 750 Hz, 1000 Hz, 1250 Hz, 1500 Hz, 1750 Hz, and 2000 Hz. The sampling frequency of the eye-tracking system may be adjusted at any time the user is viewing the images on the display.

FIGS. 3B and 3C illustrate the determination of the eye-gaze point 320 of a user by tracking movement of at least one eye of the user. A user's eye movement can be tracked using for example, the camera 312 of the eye-tracking system 300 in FIG. 3A. When the user is looking at different regions in the display area, the center of the pupil 334 changes, while the corneal reflection 332 may be used as a reference point for eye gaze estimation. Thus, the eye gaze location may be determined based on a relative position between the center of the pupil and the screen reflection corresponding to the display area reflected on a corresponding eye of the user. For example, by measuring the vector 336 between the center of the pupil and the corneal reflection, the user's eye gaze may be determined.

FIG. 3B illustrates the correlation between the vector 336 and (x, y) coordinates on the display area 162 as a user looks at the center, left, or right portions of the display area. Referring to part A of FIG. 3B, a user may be looking at the center of the display area. The camera of the eye-tracking system may capture a first image of the user's eye. A vector 336-C between the center of the pupil and the corneal reflection may be obtained from the first image. The vector 336-C may be associated with a set of coordinates (x1, y1) of an eye-gaze point 320-1 located at the center of the display area. Referring to part B of FIG. 3B, the user may be looking at a left portion of the display area, and the pupil of the eye may move to the left. The camera of the eye-tracking system may capture a second image of the user's eye. A vector 336-L between the center of the pupil and the corneal reflection may be obtained from the second image. The vector 336-L may be associated with a set of coordinates (x2, y2) of an eye-gaze point 320-2 located at the left portion of the display area. Referring to part C of FIG. 3B, the user may be looking at a right portion of the display area, and the pupil of the eye may move to the right. The camera of the eye-tracking system may capture a third image of the user's eye. A vector 336-R between the center of the pupil and the corneal reflection may be obtained from the third image. The vector 336-R may be associated with a set of coordinates (x3, y3) of an eye-gaze point 320-3 located at the right portion of the display area.

FIG. 3C illustrates the correlation between the vector 336 and (x, y) coordinates on the display area 162 as a user looks at the center, top, or bottom portions of the display area. Part A of FIG. 3C is similar to part A of FIG. 3B, in that the user is looking at the center of the display area. Referring to part B of FIG. 3C, the user may be looking at a top portion of the display area, and the pupil of the eye may move to the top. The camera of the eye-tracking system may capture a fourth image of the user's eye. A vector 336-T between the center of the pupil and the corneal reflection may be obtained from the fourth image. The vector 336-T may be associated with a set of coordinates (x4, y4) of an eye-gaze point 320-4 located at the top portion of the display area. Referring to part C of FIG. 3C, the user may be looking at a bottom portion of the display area, and the pupil of the eye may move to the bottom. The camera of the eye-tracking system may capture a fifth image of the user's eye. A vector 336-B between the center of the pupil and the corneal reflection may be obtained from the fifth image. The vector 336-B may be associated with a set of coordinates (x5, y5) of an eye-gaze point 320-5 located at the bottom portion of the display area.

Accordingly, by measuring the vector 336 based on images captured by the camera of the eye-tracking system, the coordinates of the eye-gaze point 320 on the display area 162 can be obtained. Movement in the user's eye will result in a change in the vector 336 and a corresponding change in the position of the eye-gaze point 320, thereby indicating a change in ROI of the user.

Figure 4:
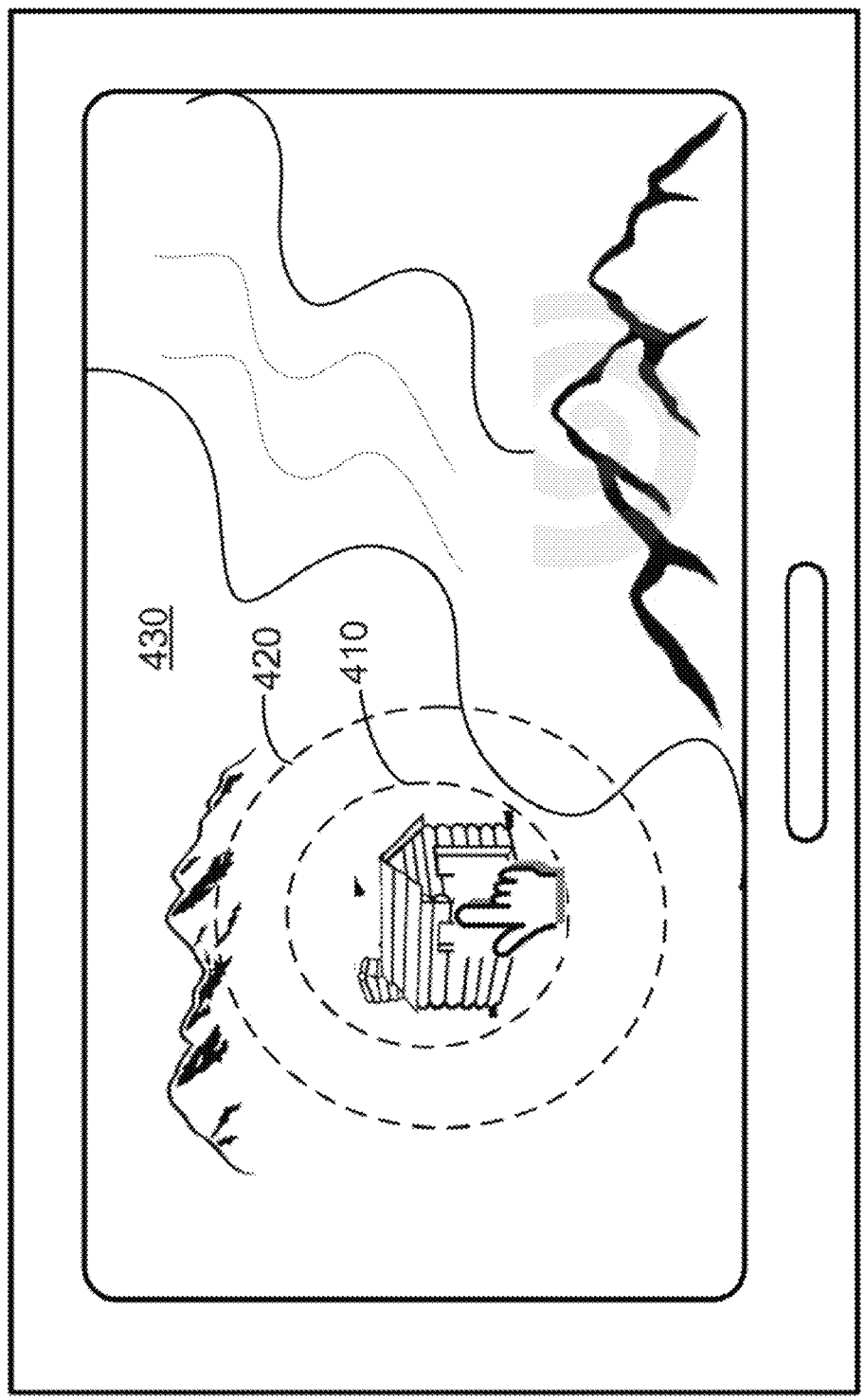
FIG. 4 illustrates a touch screen for determining a ROI of a user, in accordance with some embodiments.

FIG. 4 illustrates a touch screen 400 for determining a ROI of a user, in accordance with embodiments. As discussed herein, the display may function as an input device for receiving a user's ROI. For example, the display may be a touchscreen, and capacitive sensors may be used for sensing user's touch on the display. For example, images captured by the movable object in real-time may be shown on the touch screen, and the user may indicate his or her ROI using finger touch on the screen. For example, the user may tap the point, portion, or object shown within the display with a finger. A ROI 410 may then be determined as a region centered at the user's tapping point. For example, the ROI may be circular, rectangular, square, triangular, other polygonal, or any other suitable shaped. The ROI may have a plurality of areas in the display area, and the multiple areas of the ROI may be continuous or discontinuous. The size of the ROI may be predetermined by the user or the system. For example, the ROI may be predetermined by the user to be a circular shaped region with a certain radius. In some embodiments, the region 420 immediately outside the ROI may be determined to be a transitional region. The size and shape of the transitional region may also be predetermined by the user or the system. The rest of the display area 430 may be determined to be non-ROI region.

Alternatively or additionally, the user may interact with the display using any user interactive device, such as a mouse, keyboard, joystick, trackball, touchpad, or microphone, to indicate a ROI on the display. Alternatively or additionally, the ROI may be detected from user's motions, e.g., user pointing to a certain location on the display. For example, the ROI determination system may comprise a motion sensor for detecting the user's motions. Alternatively, the user may wear a gadget equipped with a motion sensor, and the motion sensor may collect data related to the user's motion.

The ROI may be identified dynamically in real time during a live transmission of images between the control terminal and the movable object as shown in FIG. 1B. Since the ROI for a current image or a frame of video may be based on the viewer's attention on one or more previous images or frames of video, there may be a time lag in the image processing and display based on user's ROI. This time lag may become significant if the transmission of the compressed image data and/or ROI data between the movable object and the control terminal is conducted via a limited bandwidth. Thus it is desirable to compress the ROI and non-ROI of an image using different compression rates to reduce file size and save bandwidth and other resources. Additionally, since a user's eye-gaze may be constantly changing, it may be challenging to display smoothly the images processed based on dynamic eye-tracking. For example, when a user is watching a video processed based on dynamic eye-gaze tracking, the change of the user's ROI may result in a sudden change in image quality. Thus, a method for providing a smooth transition in the image quality based on dynamic eye-tracking is desirable.

Figure 5A:
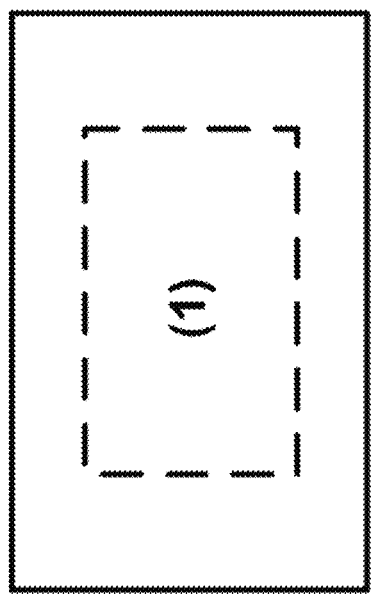
FIGS. 5A, 5B, and 5C illustrate an exemplary method for dividing a display area, in accordance with some embodiments.
Figure 5B:
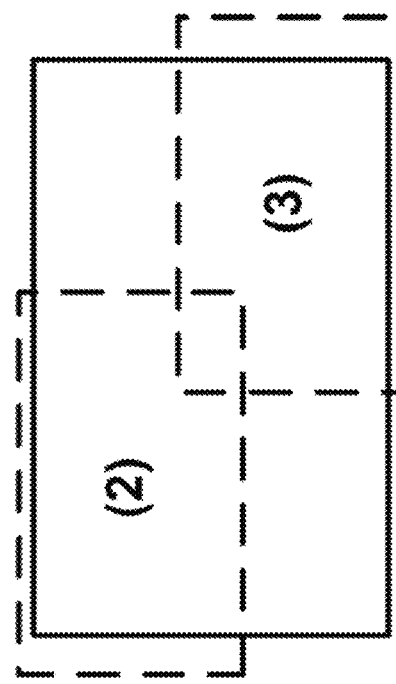
Figure 5C:
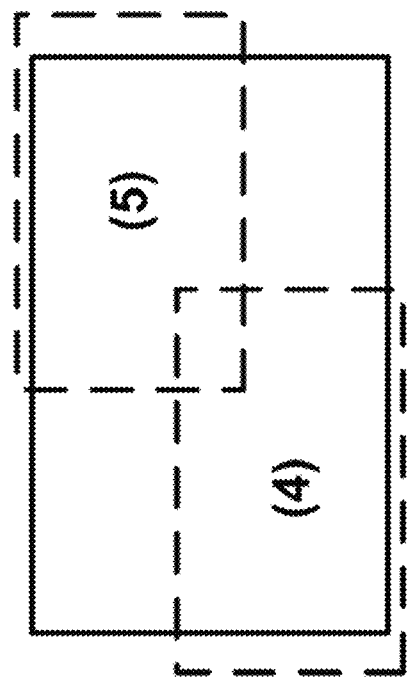

FIGS. 5A-5C and FIG. 6 illustrate an exemplary method for dividing a display area, in accordance with some embodiments. In some embodiments, the zone dividing module of the ROI determination system as discussed herein is configured to divide a display area of the display into a plurality of zones using a grid pattern. For example, as shown in FIGS. 5A-5C, five areas (e.g., areas 1-5) may be provided to divide the display area, where at least two areas of the plurality of areas are at least partially overlapped. For example, area 1 may be located in the center of the display area, and areas 2, 3, 4 and 5 may be located at upper-left, lower-right, lower-left, and upper-right of the display area. The size and shape of the individual areas may be predetermined by the user or the system. The size and shape of the individual areas may or may not be identical to each other. In some embodiments, an individual area of the plurality of areas is at least partially overlapped with the rest of the areas of the plurality of areas. The overlapping between adjacent areas may provide smooth transition for user's eye-gaze tracking and image processing. In some embodiments, the zone dividing module of the ROI determination system may provide any other suitable patterns to divide the display area. For example, the multiple areas may not overlap with each. In some embodiments, the zone dividing module may select and switch to different patterns for dividing the display area when different types of images are being captured and displayed. For example, grid patterns with larger sized areas may be used for mountain/river/sea scenes, whereas gird patterns with smaller sized areas may be used for city views where the images may include more crowded objects. The areas for dividing the display area as discussed herein may also be referred to as zones, regions, portions, parts, groups of pixels, sets of pixels, or any other suitable terminologies.

Figure 6:
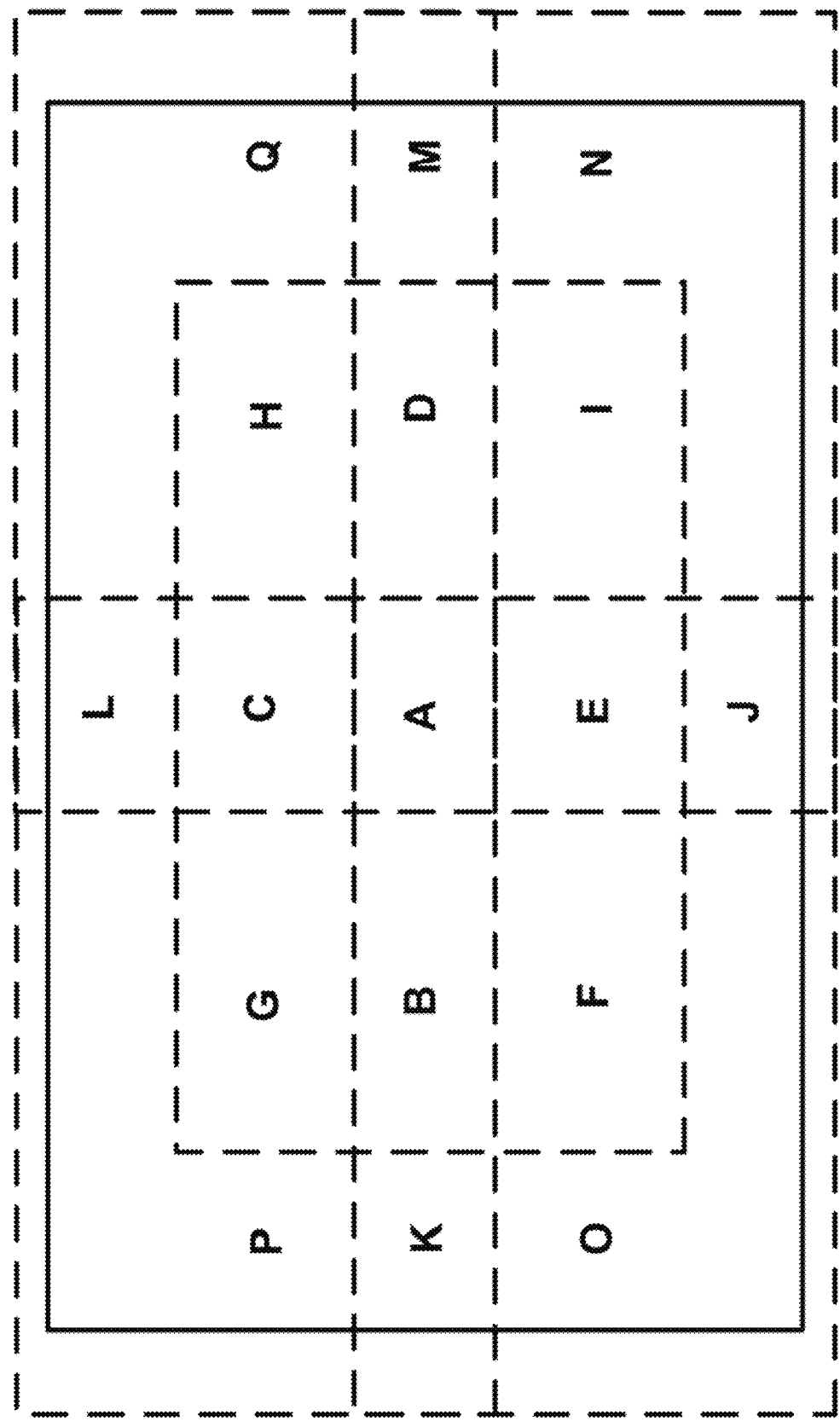
FIG. 6 illustrates an exemplary method for dividing a display area, in accordance with some embodiments.

The multiple areas illustrated in FIGS. 5A-5C, in combination, may divide the display area into a plurality of zones as shown in FIG. 6. The zones as discussed herein may also be referred to as areas, regions, portions, parts, groups of pixels, sets of pixels, or any other suitable terminologies. The size and shape of the individual zones may or may not be identical to each other. The data receiving module of the ROI determination system as discussed herein may receive ROI data collected by the sensor of the ROI determination system. The ROI zone identifying module may then identify one or more ROI zones from the plurality of zones based on the ROI data. In some embodiments, the one or more ROI zones may be identified with their respective location information in the display area. For example, 2-D coordinates in the display area, or pixels coordinates of images displayed in the display area may be used to represent the identified one or more ROI zones. In some alternative embodiments, the plurality of zones used for dividing the display area may be pre-assigned respective identifiers, such as letters, numbers, characters, etc., and the identified one or more ROI zones may be represented using the respective pre-assigned identifiers.

In order to avoid sudden change in image quality across the ROI boundary and provide smooth images based on dynamic eye-tracking, the plurality of zones in FIG. 6 may be further grouped as: Group I (center)—zone A; Group II (upper-left)—zones P and G; Group III (upper-right)—zones H and Q; Group IV (lower-left)—zones F and O; Group V (lower-right)—zones I and N; Group VI (middle-left)—zones B and K; Group VII (middle-right)—zones D and M; Group VIII (upper-middle)—zones C and L; and Group IX (lower-middle)—zones E and J. In some embodiments, when a ROI is identified to fall within a certain zone, then the corresponding group (i.e., including one or more zones) may be identified as the user's ROI. This may avoid using too small an area for identifying user's ROI.

In some examples, when the user's ROI is determined to be located in zone A, zone A is determined to be the user's ROI. The adjacent zones, e.g., zones BFEIDHCG are determined to be transitional regions or smooth regions. The rest of the display area, e.g., zones JOKPLQMN, are determined to be non-ROI.

In some other examples, when the user's ROI is determined to be located in zone B or zone K, Group VI or zones BK are identified to be the user's ROI. The adjacent zones, e.g., zones PGLCAEJFO are determined to be transitional regions or smooth regions. The rest of the display area, e.g., zones HDIQMN, are determined to be non-ROI.

In some other examples, when the user's ROI is determined to be located in zone E or zone J, the lower portion of the display area, i.e., zones OFEJIN, are identified to be the user's ROI. The middle portion of the display area, i.e., zones KBADM, are identified to be the transitional regions or smooth regions. The rest of the display area, i.e., zones PGLCHQ are identified to be non-ROI. In this situation, when user's eye-gaze changes within a certain range, the ROI may not be identified to have sudden change, and the images processed based on the ROI may not have sudden change in quality.

In yet some other examples, when the user's ROI is determined to be located in zone F or zone O, the zone FO are identified to be the user's ROI. Zones KBAEJ may be identified to be transitional regions or smooth regions. The rest of the display area, i.e., zones PGCLHQDMIN may be identified to be non-ROI.

In some embodiments, the ROI determination system may further compare one or more ROI zones identified at a first sampling point with one or more ROI zones identified at a second sampling point proceeding the first sampling point. When the one or more ROI zones at the first sampling point are different from the one or more ROI zones at the second sampling point, the ROI determination system may transmit ROI data of the one or more ROI zones at the second sampling point. When the one or more ROI zones at the first sampling point are the same as or have overlapped area with the one or more ROI zones at the second sampling point, the ROI determination system may skip transmitting ROI data of the one or more ROI zones at the second sampling point. The system may keep using the ROI data of the one or more ROI zones at the first sampling point.

Referring back to FIG. 1B, after the ROI data 172 is determined by the ROI determination system, the ROI determination system may transmit the ROI data to the image decoder and/or the communication interface. The communication interface may transmit the ROI data to the movable object. As discussed herein, the ROI data may comprise location data (e.g., coordinates) or pre-assigned identifier of the one or more identified ROI zones to the movable object.

As shown in FIG. 1B, the image encoder (e.g., a ROI data obtaining module of the image encoder) may obtain the ROI data of a user. The ROI data may be obtained when one or more images are displayed in a display area. As discussed herein, the ROI data may comprise a selection of one or more ROI zones of a plurality of predetermined zones that are used to divide the display area as shown in FIG. 6. The image encoder (e.g., an image data obtaining module) may also obtain the raw image data captured by the imaging sensor. The image encoder (e.g., an image processing module) may then process the raw image data to obtain processed image data based on the ROI data. The processed image data may comprise (1) a first set of image data selected based on the ROI data compressed at a first compression rate and (2) a second set of image data distinct from the first set of image data compressed at a second compression rate higher than the first compression rate. In some embodiments, the ROI may also comprise one or more transitional zones, and the processed image data may further comprise one or more intermediate zones (e.g., transitional zones) adjacent to and surrounding the one or more ROI zones. The image encoder may further compress a third set of image data selected based on the one or more intermediate zones at a third compression rate which is higher than the first compression rate and lower than the second compression rate.

Figure 7:
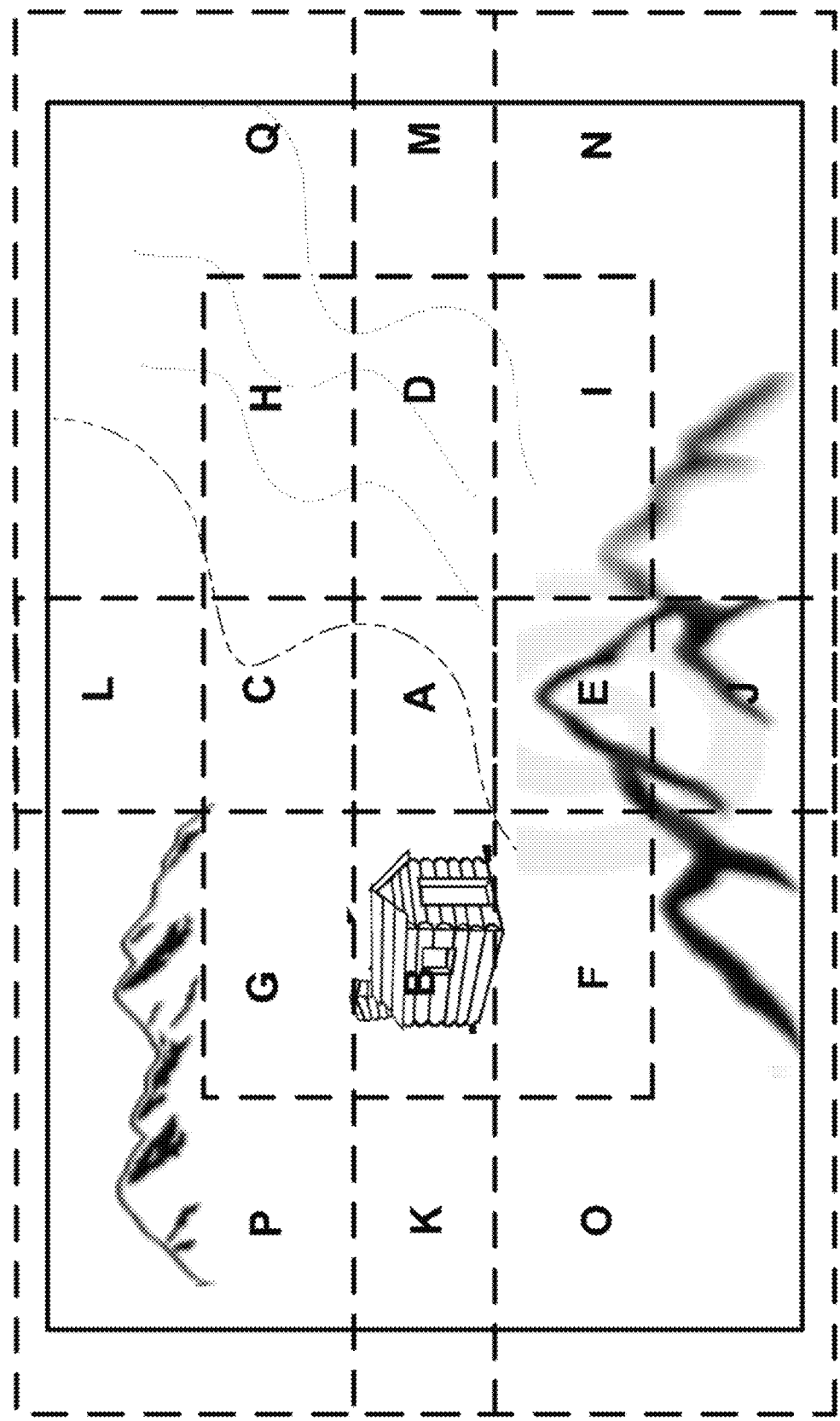
FIG. 7 illustrates an example for displaying a processed image or a frame of a video based on ROI data, in accordance with some embodiments.

FIG. 7 illustrates an example for displaying a processed image or a frame of a video based on ROI data, in accordance with some embodiments. The one or more images or videos may be captured in real-time by the imaging device borne by the movable object. In some embodiments, the grid pattern may be displayed to overlay one or more images displayed in the display area. The ROI of the user may be identified by the ROI determination system at the control terminal when the one or more images are displayed in the display area. In some examples, when the ROI of the user are identified to be in zone B or zone K (e.g., by eye-tracking or finger touch), as discussed herein, zones BK may be identified as the user ROI. Zones PGLCAEJFO may be identified to be transitional regions or smooth regions. Zones HDIQMN may be identified to be non-ROI.

The ROI determination system may transmit these ROI data to the movable object (e.g., via the image decoder or the communication interface.) The image encoder borne by the movable object may obtain the ROI data and processed the raw image data based on the ROI data. For example, different portions of the image may be compressed using different compression rates. The image data corresponding to the ROI, e.g., image data in zones BK, may be compressed using a lower QP value, thus minimum data loss may be obtained during data compression. The image data corresponding to the transitional regions, e.g., image data in zones PGLCAEJFO, may be compressed using a middle QP vale. The image data corresponding to the non-ROI, e.g., image data in zones HDIQMN may be compressed using a higher QP value, thus maximum data loss may be obtained during data compression. Thus a reduced file size may be obtained and high image quality may be retained in the ROI region after data compression. In some embodiments, the The compressed image data 122 may be transmitted from the image encoder to the image decoder at the control terminal (e.g., via communication interface). The image decoder may decompress the image data, and the images 152 may be transmitted to the display. As shown in FIG. 7, the areas corresponding to the ROI (e.g., zones BK) may have the highest image quality, the non-ROI (e.g., HDIQMN) may have the lowest image quality, and the transitional regions (e.g., PGLCAEJFO) may have the intermediate image quality. Alternatively or additionally, the image encoder may process image data in the ROI zones to have enhanced contrast, brightness, saturation, sharpening, hue, and/or other image quality than the image data in the non-ROI regions.

In some embodiments, the ROI data may be transmitted to the imaging device borne by the movable object. The imaging device (e.g., an imaging sensor adjusting module) may adjust one or more parameters of the imaging device based on the ROI data. In some embodiments, the ROI data may be used to adjust one or more parameters including, but not limited to, depth of field, aperture, shutter speed, zoom, position of the imaging sensor, focus area, and frame rate. The imaging device may capture one or more subsequent images based on the ROI data.

Figure 8:
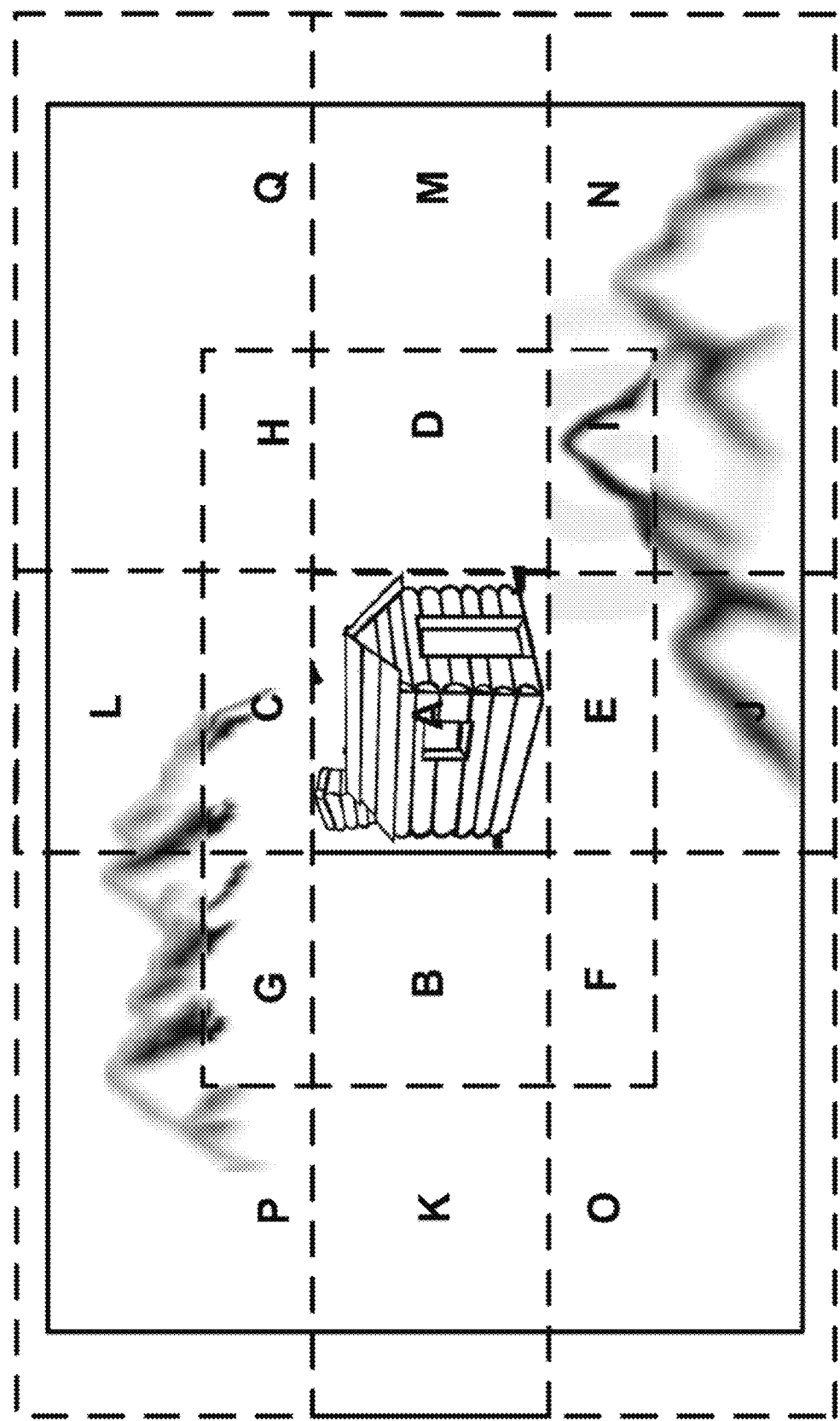
FIG. 8 illustrates another example for displaying a processed image or a frame of a video based on ROI data, in accordance with some embodiments.

FIG. 8 illustrates another example for displaying a processed image or a frame of a video based on ROI data, in accordance with some embodiments. The image displayed may also be captured by the imaging device based on the ROI data. For example, the ROI data may include ROI identified in zone A, transitional region located in zones GCHDIEFB, and non-ROI located in zones JOKPLQMN. The imaging device may select a group of pixels corresponding to zone A of an individual subsequent image to be captured. For example, as shown in FIG. 8, the imaging device may adjust its focus area to focus on the house located in zone A. Alternatively or additionally, the imaging device may detect light condition and/or configuration of the house in zone A. One or more parameters of the imaging device may further be automatically adjusted based on the detected light condition and/or object configuration in zone A. For example, the position of the imaging sensor may be adjusted such that the house is located at the center of the image.

Figure 9:
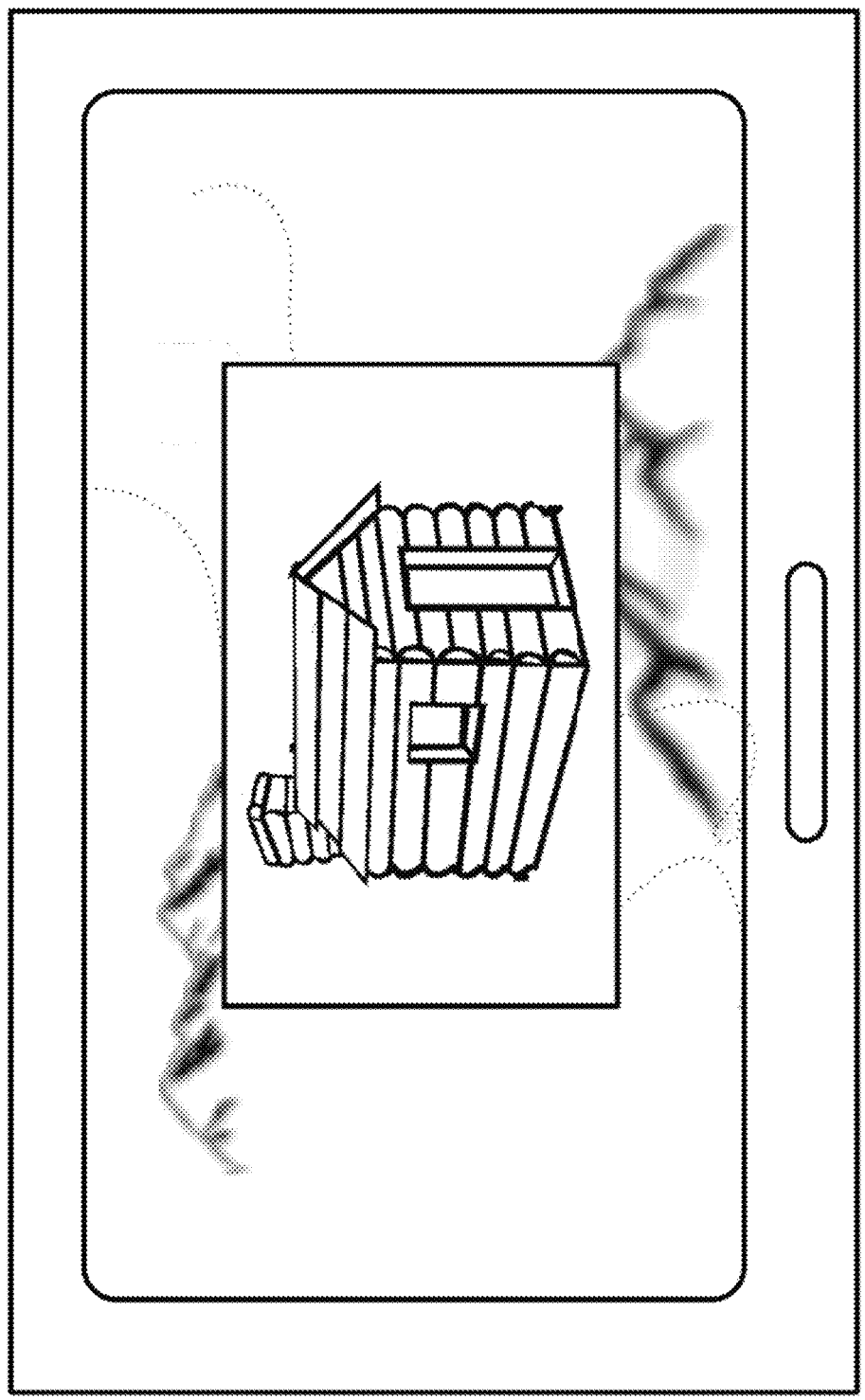
FIG. 9 illustrates another example for displaying a processed image or a frame of a video based on ROI data, in accordance with some embodiments.

The ROI data may also be transmitted to the imaging device, and the imaging device may adjust one or more parameters of the imaging device based on the ROI data. In an example as shown in FIG. 9, the imaging device may zoom in only zone A of the image. The rest of the display area, e.g., the intermediate regions and the non-ROI may be displayed as background information. The image data in zone A may be displayed to superimpose or overlay the image data in other zones as shown in FIG. 9. For example, the imaging device may zoom in to capture image data corresponding to zone A at a higher frequency (e.g., at least 50 Hz). The imaging device may zoom out to capture the overall area at a lower frequency (e.g., at most 10 Hz).

The imaging device may transmit the raw image data to the image encoder, and the image encoder may compress image data at different frequencies. For example, the image data corresponding to ROI (e.g., zone A in FIG. 9) may be compressed/processed at a first processing frequency, and the image data corresponding to the other areas of the display area may be compressed/processed at a second processing frequency which is lower than the first processing frequency. The image encoder may also compress the image data corresponding to ROI to have an enhanced image quality as discussed elsewhere herein. The compressed image data may be transmitted to the control terminal for decompression and display. Advantageously, the image data in the ROI zones may be maintained at a higher updating frequency, while the image data in other zones may be updated once in a while at a lower rate. This could save data transmission bandwidth while maintaining ROI image to be transmitted to the user with sufficient image quality and updating frequency.

A method for displaying image data may be provided in accordance with one or more of the previously-described embodiments. The method may comprise displaying one or more images of a virtual reality (VR) environment or an augmented reality (AR) environment on a display area of a display device. The method may also comprise obtaining region-of-interest (ROI) data of a user when the user is wearing the display device and looking at the one or more images of the VR environment or the AR environment displayed on the display area. The method may further comprise (1) selecting, based on the ROI data, one or more ROI zones from a plurality of zones that are used to divide the display area, and (2) effecting display of the one or more ROI zones on the display area to the user.

The display device may comprise a pair of VR-enabled glasses or AR-enabled glasses. The display area may be a screen comprising a plurality of pixels. The display area may comprise a plurality of coordinates. The ROI data may be associated with one or more sets of coordinates selected from the plurality of coordinates.

The one or more ROI zones may be selected from a plurality of zones on the display area when the ROI data indicates that a ROI of the user is within the one or more ROI zones. The ROI of the user may be associated with an eye gaze location of the user. The eye gaze location may be detected by the one or more sensors when the user is looking at the one or more images of the VR environment or the AR environment displayed on the display area.

The one or more sensors may be included in an eye-tracking system configured to collect data related to movement of at least one eye of the user. The eye-tracking system may be configured to determine the eye gaze location of the user based on a relative position between a pupil of the user and a screen reflection corresponding to the display area reflected on a corresponding eye of the user. The eye-tracking system may be configured to (1) track a location of the screen reflection on at least one eye of the user and a location of a corresponding pupil of the user, and (2) extrapolate the eye gaze location within the display area using a predetermined relationship between the location of the screen reflection and the location of the pupil.

The eye-tracking system may be configured to perform a calibration process of the user to determine the relationship between the location of the screen reflection and the location of the pupil. The eye-tracking system may be configured to track head movement of the user to determine position information of the screen reflection on the at least one eye of the user.

In some embodiments, the plurality of zones may be displayed overlaying the one or more images of the VR environment or the AR environment displayed on the display area. In some embodiments, a grid pattern comprising the plurality of zones may be displayed on the display area. The grid pattern may be displayed overlaying the one or more images of the VR environment or the AR environment displayed on the display area.

In some embodiments, at least two zones of the plurality of zones may be at least partially overlapped with each other. An individual zone of the plurality of zones may be at least partially overlapped with the rest of the zones of the plurality of zones.

In some embodiments, the one or more processors in the display device may be individually or collectively configured to (1) effect display of a first ROI zone on the display area when the ROI of the user is within the first ROI zone, and (2) effect display of a second ROI zone on the display area when the ROI of the user switches from the first ROI zone to the second ROI zone, wherein the second ROI zone is different from the first ROI zone. The first ROI zone and the second ROI zone may be located on different sections of the display area. The first ROI zone and the second ROI zone may have different sizes and/or shapes.

A first set of image data in the first ROI zone may be different from a second set of image data in the second ROI zone. In some embodiments, the first set of image data and the second set of image data may be provided within a same image of the VR environment or the AR environment on the display area. In other embodiments, the first set of image data and the second set of image data may be provided within different images of the VR environment or the AR environment on the display area. The first set of image data may be associated with a first image of the VR environment or the AR environment, and the second set of image data may be associated with a second image of the VR environment or the AR environment.

In some embodiments, effecting display of the one or more ROI zones on the display area may comprise changing a magnification and/or resolution of the one or more ROI zones. For example, image data from the one or more ROI zones may be displayed at a higher magnification and/or resolution compared to image data from one or more non-ROI zones. Image data from the one or more ROI zones may be converted to a first set of images, and image data from one or more non-ROI zones may be converted to a second set of images. The first set of images may be displayed to superimpose or overlay the second set of images on the display area.

In some embodiments, image data from the one or more ROI zones may be compressed at a first compression rate, and image data from the one or more non-ROI zones may be compressed at a second compression rate different from the first compression rate. For example, the first compression rate may be lower than the second compression rate, such that the first set of images in the one or more ROI zones is displayed at a higher quality than the second set of images in the one or more non-ROI zones. In some cases, the first set of images in the one or more ROI zones may be updated at a higher frequency than the second set of images in the one or more non-ROI zones on the display area.

In some embodiments, the first set of images in the one or more ROI zones may be configured to occupy a central region of the display area, and the second set of images in the one or more non-ROI zones may be configured to occupy a peripheral region of the display area.

In some embodiments, one or more images may be captured by an imaging sensor borne by a movable object. The movable object may be an aerial vehicle, a land vehicle, a vehicle traversing water body, a mobile phone, a tablet, a laptop, or a wearable device. The display device may be located remotely from the movable object.

The one or more captured images may be fused together with the plurality of zones to generate the one or more images of the VR environment or the AR environment displayed on the display area. The ROI data may be transmitted via one or more wired and/or wireless communication channels to the imaging sensor. One or more operating parameters of the imaging sensor may be adjusted based on the ROI data. The one or more operating parameters of the imaging sensor may comprise a depth of field, aperture size, shutter speed, zoom, focus area, frame rate, and/or position of the imaging sensor relative to the movable object. One or more operating parameters of the imaging sensor may be adjusted in order to effect display of the one or more ROI zones on the display area to the user.

In some embodiments, a graphical element may be overlay onto the one or more images of the VR environment or the AR environment displayed on the display area. The graphical element may be indicative of one or more motion characteristics of the movable object. The one or more motion characteristics of the movable object may comprise a position, speed, acceleration, and/or orientation of the movable object. The graphical element may be indicative of spatial environmental information. The spatial environmental information may comprise a relative distance and/or orientation between the movable object and another object within a physical environment where the movable object and the another object are located. In some cases, the graphical element may be configured to dynamically change on the display area as a position and/or an orientation of the movable object relative to the another object changes within the physical environment.

The systems, devices, and methods described herein can be applied to a wide variety of objects, including movable objects and stationary objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human.

Figure 10:
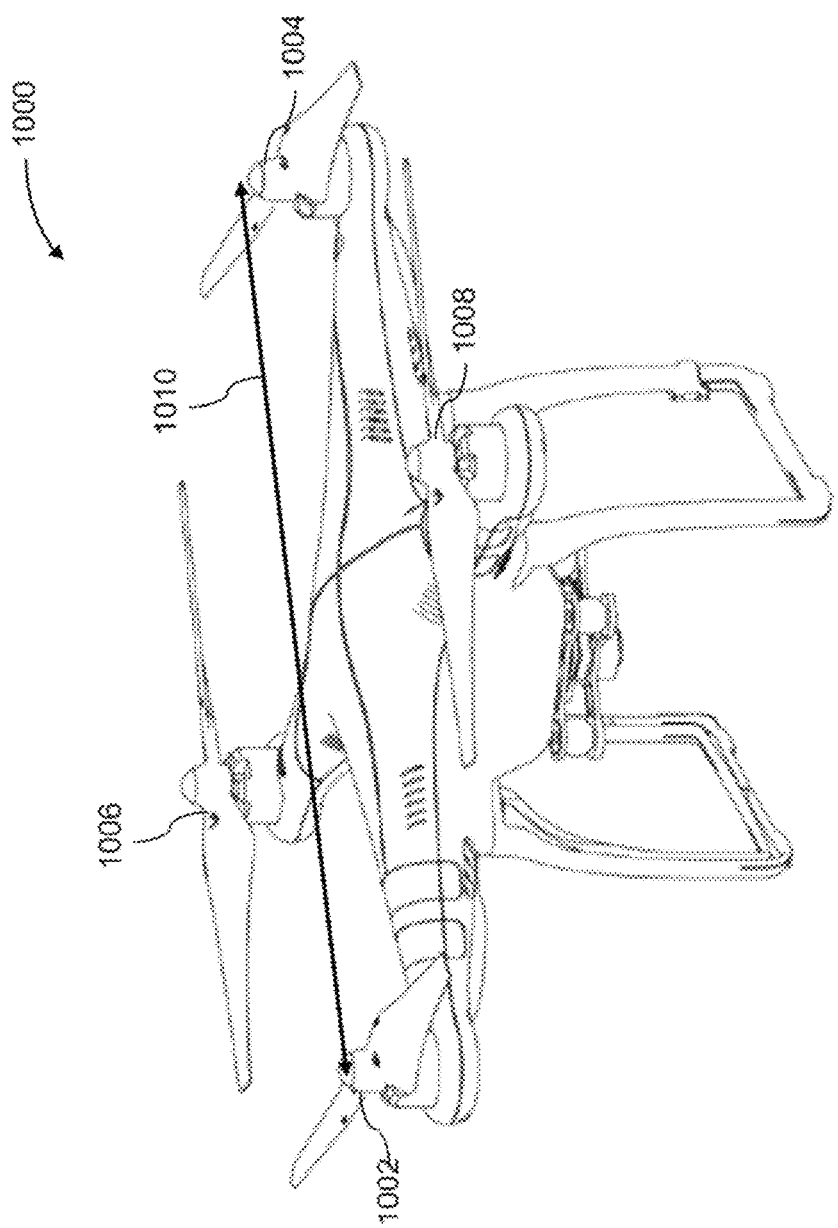
FIG. 10 illustrates an unmanned aerial vehicle (UAV), in accordance with some embodiments.

FIG. 10 illustrates an unmanned aerial vehicle (UAV) 1000, in accordance with embodiments of the present disclosure. The UAV may be an example of a movable object as described herein, to which the method and apparatus of discharging a battery assembly may be applied. The UAV 1000 can include a propulsion system having four rotors 1002, 1004, 1006, and 1008. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1010. For example, the length 1010 can be less than or equal to 2 m, or less than equal to 5 m. In some embodiments, the length 1010 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

In some embodiments, a UAV can include one or more vision sensors, also referred to herein as "imaging devices." While many embodiments are described herein as having one imaging device coupled to a UAV, it is to be understood that any number of imaging devices may be coupled to a UAV, such as one, two, three, four, five or more imaging devices. An imaging device can be configured to detect electromagnetic radiation (e.g., visible, infrared, and/or ultraviolet light) and generate image data based on the detected electromagnetic radiation. For example, an imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia).

In some embodiments, the imaging device can be a camera. A camera can be a movie or video camera that captures dynamic image data (e.g., video). A camera can be a still camera that captures static images (e.g., photographs). A camera can be a binocular camera. A binocular camera as used herein may refer to a stereo, or a stereovision camera. A stereo camera may comprise two cameras. A camera may be a monocular camera. Although certain embodiments provided herein are described in the context of cameras, it shall be understood that the present disclosure can be applied to any suitable imaging device. Any description herein relating to cameras can also be applied to any suitable imaging device or other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like.

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

The imaging device may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. The camera may be a 4K camera or a camera with a higher resolution.

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

The imaging devices may each have a field of view. The field of view of an imaging device may be the extent of the environment that is detectable (e.g., visible) by the imaging device. The field of view may be related to the angle of view, which may be measured by the angular extent of a given scene that is imaged by the imaging device. The angle of view of an imaging device may be at an angle of less than or about 360°, 300°, 240°, 180°, 150°, 120°, 90°, 60°, 30°, 20°, or 10°. The field of view may be described by the relative direction of the imaging device to the movable object. For example, the field of view may be oriented vertically, horizontally, upward, downward, side-ways, and the like relative to the movable object (e.g., a UAV). The imaging devices may each have an optical axis. The optical axis of an imaging device, which may also be referred to as the "principal axis," can be a line along which there is some degree of rotational symmetry in the imaging device. In some embodiments, the optical axis of the imaging device passes through the center of the optical components (e.g., lens, photo sensor) of the imaging device.

Imaging devices of the present disclosure can be situated on any suitable portion of a movable object, such as above, underneath, on the side(s) of, or within a body of the movable object. Some imaging devices can be mechanically coupled to the UAV such that the spatial disposition and/or motion of the movable object correspond to the spatial disposition and/or motion of the imaging device. The imaging devices can be coupled to the movable object via a rigid coupling, such that the imaging device does not move relative to the portion of the movable object to which it is attached. Alternatively, the coupling between the imaging device and the movable object can permit movement (e.g., translational or rotational movement relative to the UAV) of the imaging device relative to the movable object. For example, coupling between the imaging device and the movable object via a carrier such as a gimbal may permit movement of the imaging device relative to the movable object. The movement of the imaging device relative to the movable object may be translational (e.g., vertical, horizontal) and/or rotational (e.g., about a pitch, yaw, and/or roll axis). The movement of the imaging device relative to the movable object may be of a predetermined or known amount. One or more sensors may detect the movement of the imaging device relative to the vehicle. The movement of the imaging device relative to the movable object may be controlled remotely by user input, autonomously, or semi-autonomously. The coupling can be a permanent coupling or non-permanent (e.g., releasable) coupling. Suitable coupling methods can include adhesives, bonding, welding, and/or fasteners (e.g., screws, nails, pins, etc.). Optionally, the imaging device can be integrally formed with a portion of the movable object. Furthermore, the imaging device can be electrically coupled with a portion of the movable object (e.g., processing unit, control system, data storage) so as to enable the data collected by the imaging device to be used for various functions of the UAV (e.g., navigation, control, propulsion, communication with a user or other device, etc.), such as the embodiments discussed herein. The imaging device may be operably coupled with a portion of the UAV (e.g., processing unit, control system, data storage).

One or more images may be captured by an imaging device. A sequence of two or more images may be captured by an imaging device. For example, a sequence of about 2, 3, 4, 5, 10, 15, 20, 25, 50, 100, 150, 200, or more images may be captured by the imaging device. The imaging device may capture a sequence of images at a specific capture rate. In some embodiments, the sequence of images may be captured at standard video frame rates such as about 24 p, 25 p, 30 p, 48 p, 50 p, 60 p, 72 p, 90 p, 100 p, 120 p, 300 p, 50 i, or 60 i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.002 seconds, 0.05 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, texture of environment being captured).

Figure 11:
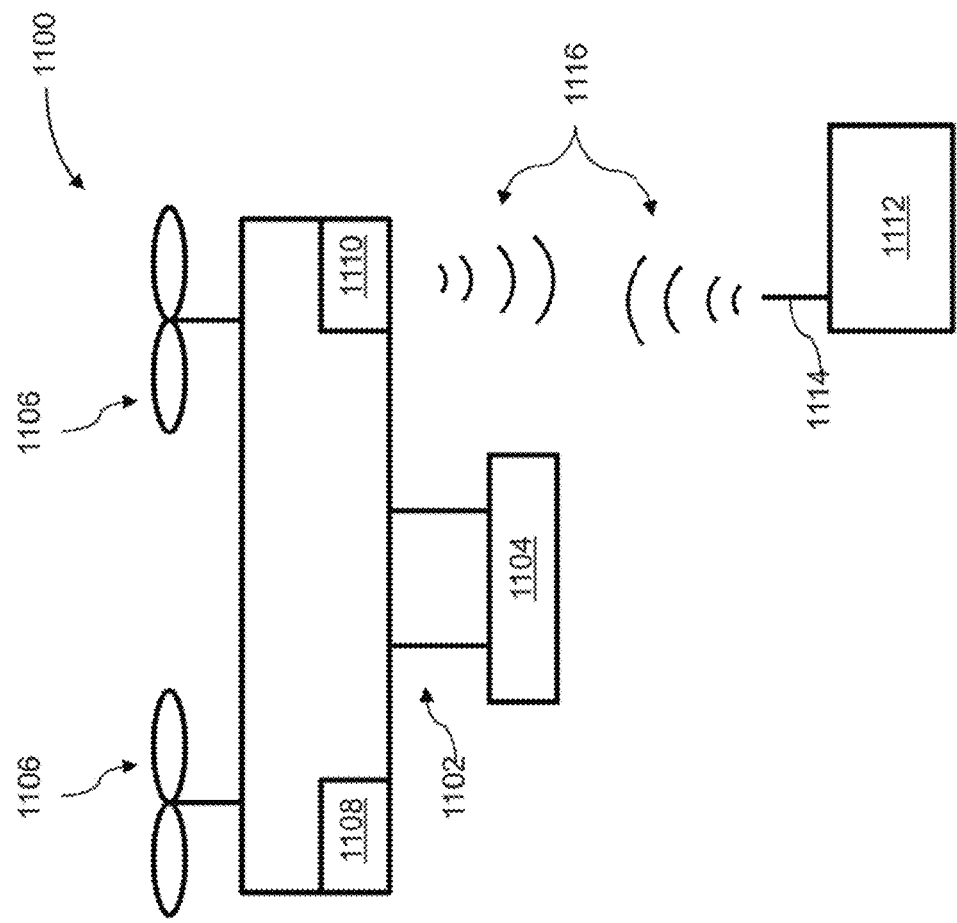
FIG. 11 illustrates a movable object including a carrier and a payload, in accordance with some embodiments.

FIG. 11 illustrates a movable object 1100 including a carrier 1102 and a payload 1104, in accordance with embodiments of the present disclosure. Although the movable object 1100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1104 may be provided on the movable object 1100 without requiring the carrier 1102. The movable object 1100 may include propulsion mechanisms 1106, a sensing system 1108, and a communication system 1110.

The propulsion mechanisms 1106 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1106 can be mounted on the movable object 1100 using any suitable means, such as a support element (e.g., a drive shaft) as described elsewhere herein. The propulsion mechanisms 1106 can be mounted on any suitable portion of the movable object 1100, such on the top, bottom, front, back, sides, or suitable combinations thereof.

In some embodiments, the propulsion mechanisms 1106 can enable the movable object 1300 to take off vertically from a surface or land vertically on a surface without requiring any horizontal movement of the movable object 1100 (e.g., without traveling down a runway). Optionally, the propulsion mechanisms 1106 can be operable to permit the movable object 1100 to hover in the air at a specified position and/or orientation. One or more of the propulsion mechanisms 1100 may be controlled independently of the other propulsion mechanisms. Alternatively, the propulsion mechanisms 1100 can be configured to be controlled simultaneously. For example, the movable object 1100 can have multiple horizontally oriented rotors that can provide lift and/or thrust to the movable object. The multiple horizontally oriented rotors can be actuated to provide vertical takeoff, vertical landing, and hovering capabilities to the movable object 1100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1100 (e.g., with respect to up to three degrees of translation and up to three degrees of rotation).

The sensing system 1108 can include one or more sensors that may sense the spatial disposition, velocity, and/or acceleration of the movable object 1100 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1108 can be used to control the spatial disposition, velocity, and/or orientation of the movable object 1100 (e.g., using a suitable processing unit and/or control module, as described below). Alternatively, the sensing system 1108 can be used to provide data regarding the environment surrounding the movable object, such as weather conditions, proximity to potential obstacles, location of geographical features, location of manmade structures, and the like.

The communication system 1110 enables communication with terminal 1112 having a communication system 1114 via wireless signals 1116. The communication systems 1110, 1114 may include any number of transmitters, receivers, and/or transceivers suitable for wireless communication. The communication may be one-way communication, such that data can be transmitted in only one direction. For example, one-way communication may involve only the movable object 1100 transmitting data to the terminal 1112, or vice-versa. The data may be transmitted from one or more transmitters of the communication system 1110 to one or more receivers of the communication system 1112, or vice-versa. Alternatively, the communication may be two-way communication, such that data can be transmitted in both directions between the movable object 1100 and the terminal 1112. The two-way communication can involve transmitting data from one or more transmitters of the communication system 1110 to one or more receivers of the communication system 1114, and vice-versa.

In some embodiments, the terminal 1112 can provide control data to one or more of the movable object 1100, carrier 1102, and payload 1104 and receive information from one or more of the movable object 1100, carrier 1102, and payload 1104 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1106), or a movement of the payload with respect to the movable object (e.g., via control of the carrier 1102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1108 or of the payload 1104). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1112 can be configured to control a state of one or more of the movable object 1100, carrier 1102, or payload 1104. Alternatively or in combination, the carrier 1102 and payload 1104 can also each include a communication module configured to communicate with terminal 1112, such that the terminal can communicate with and control each of the movable object 1100, carrier 1102, and payload 1104 independently.

In some embodiments, the movable object 1100 can be configured to communicate with another remote device in addition to the terminal 1112, or instead of the terminal 1112. The terminal 1112 may also be configured to communicate with another remote device as well as the movable object 1100. For example, the movable object 1100 and/or terminal 1112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1100, receive data from the movable object 1100, transmit data to the terminal 1112, and/or receive data from the terminal 1112. Optionally, the remote device can be connected to the Internet or other telecommunications network, such that data received from the movable object 1100 and/or terminal 1112 can be uploaded to a website or server.

Figure 12:
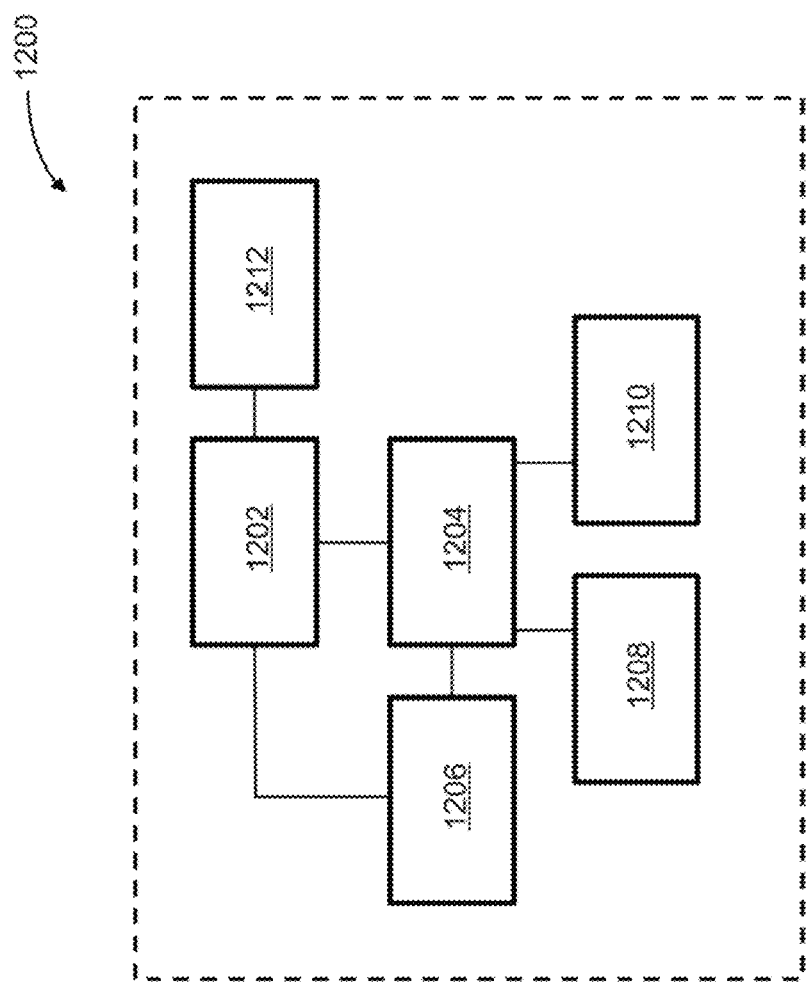
FIG. 12 is a schematic illustration by way of block diagram of a system for controlling a movable object, in accordance with some embodiments.

FIG. 12 is a schematic illustration by way of block diagram of a system 1200 for controlling a movable object, in accordance with embodiments of the present disclosure. The system 1200 can be used in combination with any suitable embodiment of the systems, devices, and methods disclosed herein. The system 1200 can include a sensing module 1202, processing unit 1204, non-transitory computer readable medium 1206, control module 1208, and communication module 1210.

The sensing module 1202 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1202 can be operatively coupled to a processing unit 1204 having a plurality of processors. In some embodiments, the sensing module can be operatively coupled to a transmission module 1212 (e.g., a Wi-Fi image transmission module) configured to directly transmit sensing data to a suitable external device or system. For example, the transmission module 1212 can be used to transmit images captured by a camera of the sensing module 1202 to a remote terminal.

The processing unit 1204 can have one or more processors, such as a programmable processor (e.g., a central processing unit (CPU)). The processing unit 1204 can be operatively coupled to a non-transitory computer readable medium 1206. The non-transitory computer readable medium 1206 can store logic, code, and/or program instructions executable by the processing unit 1204 for performing one or more steps. The non-transitory computer readable medium can include one or more memory units (e.g., removable media or external storage such as an SD card or random access memory (RAM)). In some embodiments, data from the sensing module 1202 can be directly conveyed to and stored within the memory units of the non-transitory computer readable medium 1206. The memory units of the non-transitory computer readable medium 1206 can store logic, code and/or program instructions executable by the processing unit 1204 to perform any suitable embodiment of the methods described herein. For example, the processing unit 1204 can be configured to execute instructions causing one or more processors of the processing unit 1204 to analyze sensing data produced by the sensing module. The memory units can store sensing data from the sensing module to be processed by the processing unit 1204. In some embodiments, the memory units of the non-transitory computer readable medium 1206 can be used to store the processing results produced by the processing unit 1204.

In some embodiments, the processing unit 1204 can be operatively coupled to a control module 1208 configured to control a state of the movable object. For example, the control module 1208 can be configured to control the propulsion mechanisms of the movable object to adjust the spatial disposition, velocity, and/or acceleration of the movable object with respect to six degrees of freedom. Alternatively or in combination, the control module 1208 can control one or more of a state of a carrier, payload, or sensing module.

The processing unit 1204 can be operatively coupled to a communication module 1210 configured to transmit and/or receive data from one or more external devices (e.g., a terminal, display device, or other remote controller). Any suitable means of communication can be used, such as wired communication or wireless communication. For example, the communication module 1210 can utilize one or more of local area networks (LAN), wide area networks (WAN), infrared, radio, Wi-Fi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1210 can transmit and/or receive one or more of sensing data from the sensing module 1202, processing results produced by the processing unit 1204, predetermined control data, user commands from a terminal or remote controller, and the like.

The components of the system 1200 can be arranged in any suitable configuration. For example, one or more of the components of the system 1200 can be located on the movable object, carrier, payload, terminal, sensing system, or an additional external device in communication with one or more of the above. Additionally, although FIG. 12 depicts a single processing unit 1204 and a single non-transitory computer readable medium 1206, one of skill in the art would appreciate that this is not intended to be limiting, and that the system 1200 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1400 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A display device configured to display image data and to be worn by a user, comprising:
a display area configured to display one or more images of a virtual reality (VR) environment or an augmented reality (AR) environment;
one or more sensors configured to obtain region-of-interest (ROI) data of the user in response to the user wearing the display device and looking at the one or more images of the VR environment or the AR environment displayed on the display area; and
one or more processors individually or collectively configured to:
divide the one or more images of the VR environment or the AR environment on the display area into a plurality of zones;
select, based on the ROI data, one or more ROI zones from the plurality of zones;
process the one or more ROI zones with a first compression rate, and process one or more non-ROI zones of the plurality of zones with a second compression rate greater than the first compression rate; and effect display of the one or more ROI zones on the display area based on the first compression rate to the user.

2. The display device of claim 1, wherein:
the display device comprises a pair of VR-enabled or AR-enabled glasses, or a VR-enabled or AR-enabled head-mounted display; and
the display area is a screen comprising a plurality of pixels.

3. The display device of claim 1, wherein:
the display area comprises a plurality of coordinates; and
the ROI data is associated with one or more sets of coordinates selected from the plurality of coordinates.

4. The display device of claim 1, wherein the one or more ROI zones are selected from the plurality of zones in response to the ROI data indicating that an ROI of the user is within the one or more ROI zones.

5. The display device of claim 4, wherein:
the ROI of the user is associated with an eye gaze location of the user detected by the one or more sensors in response to the user looking at the one or more images of the VR environment or the AR environment displayed on the display area; and
the one or more sensors are included in an eye-tracking system configured to collect data related to movement of at least one eye of the user.

6. The display device of claim 5, wherein the eye-tracking system is configured to determine the eye gaze location of the user based on a relative position between a pupil of the user and a screen reflection corresponding to the display area reflected on one of the at least one eye of the user that corresponds to the pupil of the user.

7. The display device of claim 6, wherein the eye-tracking system is further configured to:
track a location of the screen reflection on the one of the at least one eye of the user and a location of the pupil of the user; and
extrapolate the eye gaze location within the display area using a predetermined relationship between the location of the screen reflection and the location of the pupil.

8. The display device of claim 7, wherein the eye-tracking system is further configured to perform a calibration process of the user to determine the relationship between the location of the screen reflection and the location of the pupil.

9. The display device of claim 8, wherein the eye-tracking system is further configured to track head movement of the user to determine position information of the screen reflection on the one of the at least one eye of the user.

10. The display device of claim 4, wherein the plurality of zones are displayed overlaying the one or more images of the VR environment or the AR environment displayed on the display area.

11. The display device of claim 4, wherein the one or more processors are further individually or collectively configured to:
effect display of a first ROI zone on the display area in response to the ROI of the user being within the first ROI zone; and
effect display of a second ROI zone on the display area in response to the ROI of the user switching from the first ROI zone to the second ROI zone, the second ROI zone being different from the first ROI zone.

12. The display device of claim 11, wherein:
a first set of image data in the first ROI zone is different from a second set of image data in the second ROI zone; and
the first set of image data and the second set of image data are provided within a same image of the VR environment or the AR environment on the display area.

13. The display device of claim 1, wherein the one or more processors are individually or collectively configured to change a magnification and/or resolution of the one or more ROI zones when effecting display of the one or more ROI zones on the display area.

14. The display device of claim 13, wherein image data from the one or more ROI zones is displayed at a higher magnification and/or resolution compared to image data from one or more non-ROI zones.

15. The display device of claim 14, wherein:
the image data from the one or more ROI zones is converted to a first set of images, and the image data from the one or more non-ROI zones is converted to a second set of images; and
the first set of images is displayed to superimpose or overlay the second set of images on the display area.

16. The display device of claim 15, wherein the image data from the one or more ROI zones is compressed at the first compression rate, and the image data from the one or more non-ROI zones is compressed at the second compression rate.

17. The display device of claim 16, wherein the one or more processors are further configured to display, based on the first compression rate, the first set of images in the one or more ROI zones at a higher quality than the second set of images in the one or more non-ROI zones.

18. The display device of claim 1, wherein:
one or more images are captured by an imaging sensor borne by a movable object, and the one or more captured images are fused together with the plurality of zones to generate the one or more images of the VR environment or the AR environment displayed on the display area;
the ROI data is transmitted via one or more wired and/or wireless communication channels to the imaging sensor; and
one or more operating parameters of the imaging sensor are adjusted based on the ROI data.

19. The display device of claim 18, wherein:
a graphical element is overlay onto the one or more images of the VR environment or the AR environment displayed on the display area; and
the graphical element is indicative of spatial environmental information that comprises a relative distance and/or orientation between the movable object and another object within a physical environment where the movable object and the another object are located.

* * * * *